(12) United States Patent
Greenberger et al.

(10) Patent No.: US 10,623,890 B1
(45) Date of Patent: Apr. 14, 2020

(54) EVENT-BASED LOCATION BASED SERVICES

(71) Applicant: International Business Machines Corporation, Armonk, NY (US)

(72) Inventors: Jeremy A. Greenberger, San Jose, CA (US); Lisa Seacat Deluca, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/203,938

(22) Filed: Nov. 29, 2018

(51) Int. Cl.
*H04L 12/58* (2006.01)
*G06Q 50/00* (2012.01)
*G06F 17/27* (2006.01)
*H04W 4/021* (2018.01)

(52) U.S. Cl.
CPC ........ *H04W 4/021* (2013.01); *G06F 17/2785* (2013.01); *G06Q 50/01* (2013.01); *H04L 51/24* (2013.01)

(58) Field of Classification Search
CPC ....... H04W 4/021; H04L 51/24; G06Q 50/01; G06F 17/2785
See application file for complete search history.

(56) References Cited

U.S. PATENT DOCUMENTS

| 9,602,606 | B2 |   | 3/2017 | Wheatley |   |
|---|---|---|---|---|---|
| 10,142,213 | B1 | * | 11/2018 | Hart | ........................ H04L 67/18 |
| 2011/0246277 | A1 |   | 10/2011 | Neldurg et al. |   |
| 2016/0132924 | A1 | * | 5/2016 | Thirugnanasundaram | .................. G06Q 30/0252 705/14.5 |
| 2017/0098256 | A1 |   | 4/2017 | Long et al. |   |
| 2019/0116505 | A1 | * | 4/2019 | Bhorkar | .................. H04L 47/70 |

OTHER PUBLICATIONS

P. Mell, et al. "*The NIST Definition of Cloud Computing*", NIST Special Publication 800-145, Sep. 2011, Gaithersburg, MD.

* cited by examiner

*Primary Examiner* — Joseph E Dean, Jr.

(74) *Attorney, Agent, or Firm* — Isaac Gooshaw, Esq.; George S. Blasiak, Esq.; Heslin Rothenberg Farley & Mesiti P.C.

(57) ABSTRACT

Methods, computer program products, and systems are presented. The method computer program products, and systems can include, for instance: examining social media system data, wherein the social media system data includes text based post content of a plurality of users of a social media system having the social media system data, and wherein the examining includes running a Natural Language Processing (NLP) process to return from the examining social media system data topic classifiers; identifying a planned venue event in dependence on the examining, wherein the planned venue event is planned for occurrence at an event venue; determining a relevance of the planned venue event to an enterprise, the enterprise having an associated enterprise venue; and providing one or more output in dependence on the determining.

20 Claims, 14 Drawing Sheets

EVENT-BASED LOCATION BASED SERVICES

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: examining social media system data, wherein the social media system data includes text based post content of a plurality of users of a social media system having the social media system data, and wherein the examining includes running a Natural Language Processing (NLP) process to return from the examining social media system data topic classifiers; identifying a planned venue event in dependence on the examining, wherein the planned venue event is planned for occurrence at an event venue; determining a relevance of the planned venue event to an enterprise, the enterprise having an associated enterprise venue; and providing one or more output in dependence on the determining.

In another aspect, a computer program product can be provided. The computer program product can include a computer readable storage medium readable by one or more processing circuit and storing instructions for execution by one or more processor for performing a method. The method can include, for example: examining social media system data, wherein the social media system data includes text based post content of a plurality of users of a social media system having the social media system data, and wherein the examining includes running a Natural Language Processing (NLP) process to return from the examining social media system data topic classifiers; identifying a planned venue event in dependence on the examining, wherein the planned venue event is planned for occurrence at an event venue; determining a relevance of the planned venue event to an enterprise, the enterprise having an associated enterprise venue; and providing one or more output in dependence on the determining.

In a further aspect, a system can be provided. The system can include, for example a memory. In addition, the system can include one or more processor in communication with the memory. Further, the system can include program instructions executable by the one or more processor via the memory to perform a method. The method can include, for example: examining social media system data, wherein the social media system data includes text based post content of a plurality of users of a social media system having the social media system data, and wherein the examining includes running a Natural Language Processing (NLP) process to return from the examining social media system data topic classifiers; identifying a planned venue event in dependence on the examining, wherein the planned venue event is planned for occurrence at an event venue; determining a relevance of the planned venue event to an enterprise, the enterprise having an associated enterprise venue; and providing one or more output in dependence on the determining.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
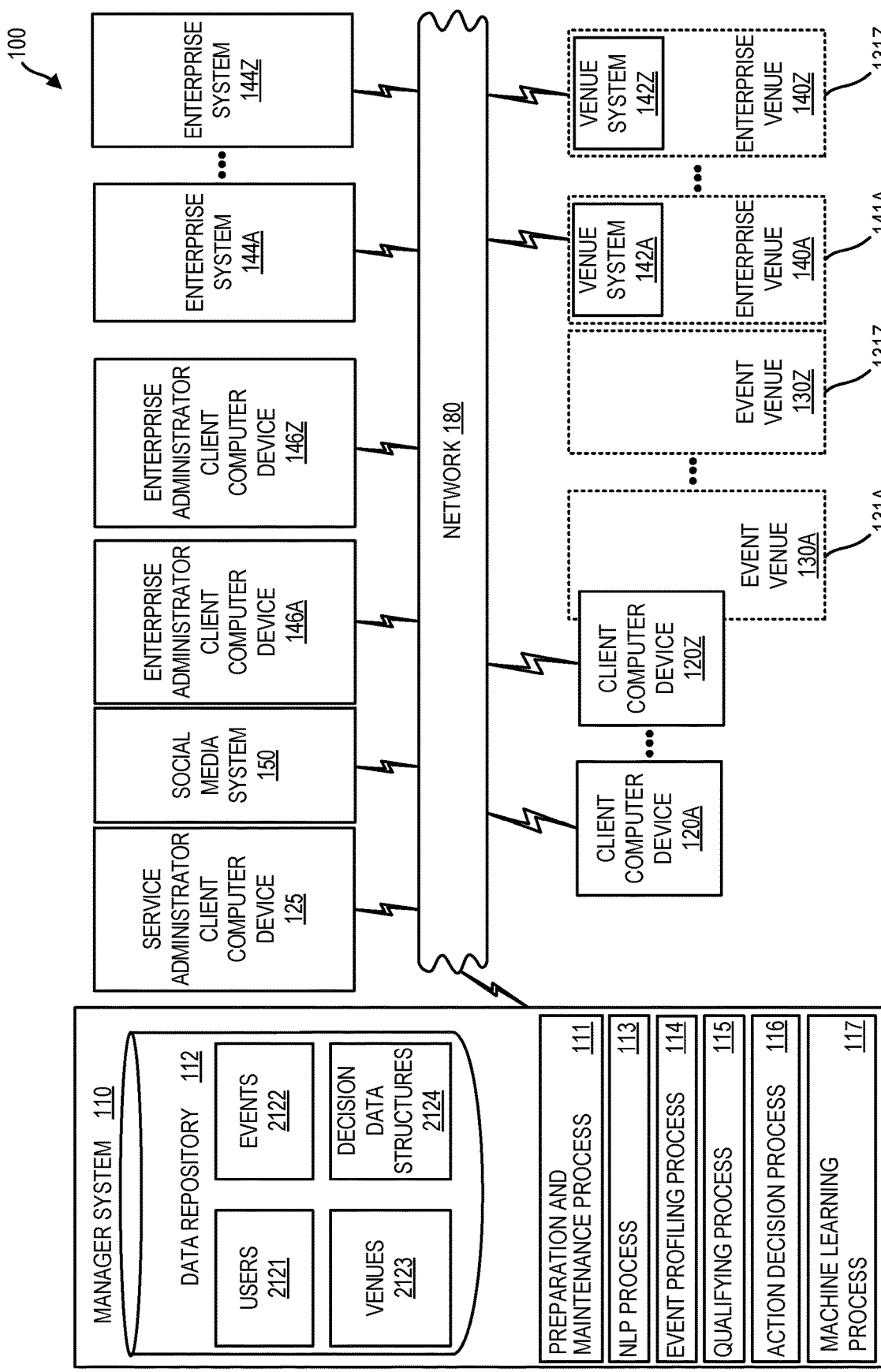
FIG. 1 depicts a system having a manager system, client computer devices, enterprise systems, enterprise administrator client computer devices, and a social media system according to one embodiment.

System 100 for use in interacting with users is shown in FIG. 1. System 100 can include manager system 110 having an associated data repository 112, client computer devices 120A-120Z, administrator client computer device 125, social media system 150, venue systems 142A-142Z, enterprise systems 144A-144Z, and enterprise client computer devices 146A-146Z in communication with one another via network 180. System 100 can include numerous devices which can be computing node based devices connected by network 180. Network 180 can be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

Client computer devices 120A-120Z can be mobile computer devices moveable between locations, internal and external to both event venues 130A-130Z and enterprise venues 140A-140Z. Client computer devices 120A-120Z can be connected to network 180 by alternative radio communication technologies, e.g. via cellular network and/or wireless LAN, e.g. IEEE 802.11 wireless communication technologies. Each of the different client computer devices 120A-120Z can be associated to a different user. A client computer device of client computer device 120A-120Z according to one embodiment can be a computing node device provided by a client computer, e.g. a mobile device such as a smart phone or tablet, a laptop, and/or smartwatch that runs one or more program, e.g. including a web browser from opening and viewing webpages.

Embodiments herein recognize that a flow of persons within an environment can be in dependence on planned events such as planned events that can be planned by users using one or more social media system 150. Embodiments herein according to one embodiment set forth to identify planned events by way of processes including examination of data of one or more social media system 150. Embodiments herein can return action decisions in dependence on an identified planned event identified by examination of data of one or more social media system 150.

According to one embodiment as set forth in reference to FIG. 1, enterprise venue 140A can be a venue operated by an enterprise that is located in proximity with event venue 130A which is a venue hosting an event planned by users using one or more social media system 150. According to one embodiment, manager system 110 can return action decisions causing a flow of attendees at an event of event venue 130A to enterprise venue 140A. Referring further to FIG. 1, event venues 130A-130Z can be public event venues at which an event is held, e.g. a park, a conference center, library, hotel, and the like. Enterprise venues 140A-140Z can be venues operated by an enterprise such as a retailer service enterprise. Enterprise venues 140A-140Z can be provide, e.g. by a retail store, an entertainment services center, and the like.

According to one embodiment, an enterprise venue 140A can be co-located with an event venue 130A as shown in FIG. 1. Enterprise venues 140A-140Z can have associated venue systems 142A-142Z, e.g. as may be provided by a server, a retail store, or entertainment services center. Enterprise venues 140A-140Z that can have associated venue systems 142A-142Z can have associated enterprise systems 144A-144Z, e.g. as may be provided by a data center operated or used by an item retail or entertainment services enterprise. Enterprise systems 144A-144Z can have associated enterprise client computer devices 146A-146Z for use by an enterprise administrator for configuring system 100.

Social media system 150 can include a collection of files, including for example, HTML files, CSS files, image files, and JavaScript files. Social media system 150 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment.

Data repository 112 can store various data. Users area 2121 of data repository 112 can store data specifying users of system 100. On identification of a new user of system 100 manager system 110 can assign a new user a universally unique identifier (UUID). Users area 2121 can store user profile data regarding various users such as preferences of various users which can be determined, e.g. by way of manager system 110 examining user post data of social media system 150, e.g. the content of posts entered by users of system 100 using social media system 150.

Data repository 112 in events area 2122 can store data on events that have been profiled by manager system 110. Manager system 110 profiling an event can include manager system 110 identifying an event. Manager system 110 identifying an event can include manager system 110 employing, e.g. natural language processing (NLP) processing to segment data, e.g. text based data of social media system 150 to identify topics and keywords indicative of an event being planned. Topics triggering the identification of an event can include such topics as "event", "party", "gathering", "show", and the like. Keywords triggering the identification of an event can include such keywords as "PLEASE ATTEND", "YOU ARE INVITED", "DON'T MISS", and the like. For the identification of an event, manager system 110 can identify, e.g. text based specifiers that specify specific dates and times for venue events. Data repository 112 in events area 2122 can include log statistics associated to an event, e.g. number of event post interacting users, classifications of interactions of interacting users, data on users who have accepted an invitation to an event, data on users who have actually attended an event, data on length of time of users with respect to an event, and the like.

Data repository 112 in venues area 2123 can store data on venues of system 100 serving as event venues and/or enterprise venues. In venues area 2123 data repository 112 can store, e.g. sets of coordinate locations that define a spatial perimeter of a venue. For example, with reference to FIG. 1 event venues 130A-130Z have associated venue spatial perimeters 131A-131Z and enterprise venues 140A-140Z can have associated spatial perimeters 141A-141Z that can be defined by sets of coordinate locations defining such perimeters.

Data repository 112 in decision data structures area 2124 can store decision data structures for use in returning action decisions provided by manager system 110. A decision data structure stored in decision data structures area 2124 for example, e.g. can include a decision data structure that specifies the configuration of a notification sent to a user interacting with an event post and/or attending an event identified by manager system 110 examining data of social media system 150.

Manager system 110 can run various processes including preparation and maintenance process 111, natural language processing (NLP) process 113, event profiling process 114, qualifying process 115, action decision process 116, and machine learning process 117.

Manager system 110 running preparation and maintenance process 111 can include manager system 110 obtaining data from various sources, e.g. social media system 150, client computer devices 120A-120Z, administrator client computer device 125, and/or enterprise client computer devices 146A-146Z, processing such data for storage into one or more areas 2121-2124 of data repository 112.

Manager system 110 running NLP process 113 can include manager system 110 processing data for preparation of records that are stored in data repository 112 and for other purposes. Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) word segmentation so that individual words or groups of words can be subject to processing separately (b) topic classification and output of one or more topic NLP output parameter for a received message (c) sentiment classification and output of one or more sentiment NLP output parameter for a received message or (d) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running event profiling process 114 can include manager system 110 examining data such as data of social media system 150 to identify an event and to further develop data characterizing an event. Manager system 110 running event profiling process 114 can include manager system 110 activating NLP process 113 to segment and further process data of social media system 150.

Manager system 110 running qualifying process 115 can determined whether an identified event identified by examining data of social media system 150 qualifies for responsive action being taken in response to the planned event by an enterprise such as an enterprise operating an enterprise system and venue. Manager system 110 running qualifying process 115 can include manager system 110 applying a multiple factor function wherein factors can include such factors as a topic factor, an event size factor, a location factor, and/or a time factor.

Manager system 110 running action decision process 116 can employ a decision data structure of decision data structures area 2124 to return one or more action decision. A return action decision can be in dependence on various data, e.g. data specifying a users interaction with an event, e.g. virtual interaction with an event such as in the form of an event post interaction or interactions in the form of physical interactions such as physically attending an event at a specified venue.

Manager system 110 running machine learning process 117 can train one or more predictive models for use in enhancing performance of manager system 110. Predictive models that can be used by manager system 110 can include predictive models trained by machine learning processes including supervised machine learning process. Machine learning trained predictive models can predict, e.g. predicted event classification in dependence on return topics returned by examination of social media posts regarding an event, a predicted attendance or nonattendance of an individual user, and/or a predictive model to predict the number of attendees of an event.

Figure 2:
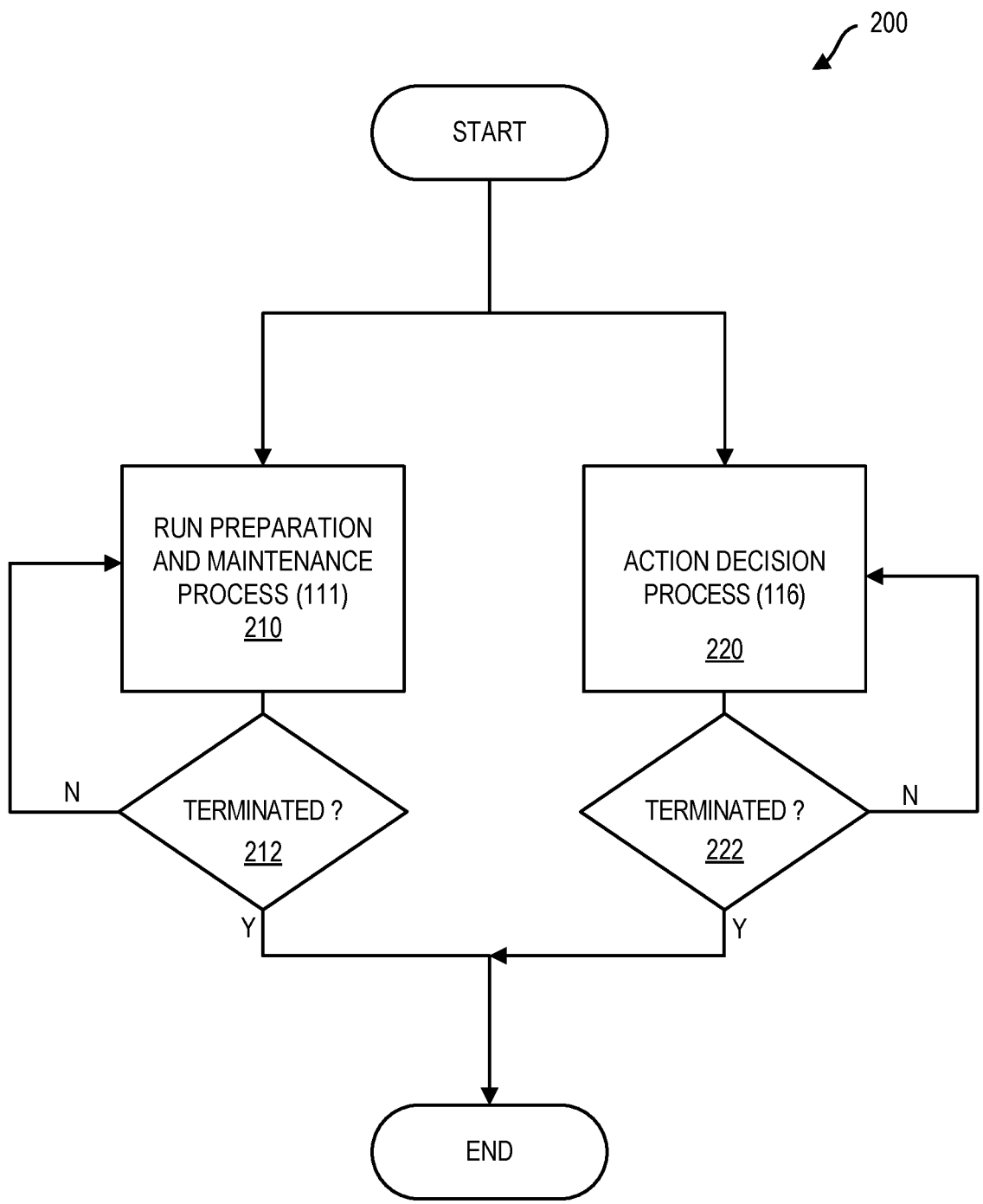
FIG. 2 is a flowchart illustrating a method for performance by a manager system according to one embodiment.

FIG. 2 is a flowchart illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of areas 2121-2124. Manager system 110 can run preparation and maintenance process 111 iteratively until process 111 is terminated at block 212.

At block 220, manager system 110 can run action decision process 116. For support of running of action decision process 116 iteratively, manager system 110 can be running e.g. NLP process 113, event profiling process 114, qualifying process 115, and/or machine learning process 117 iteratively. Manager system 110 can run action decision process 116 until action decision process 116 is terminated at block 222. Manager system 110 can run preparation and maintenance process 111 and action decision process 116 concurrently and can run each of process 111 and process 116 iteratively.

Figure 3A:
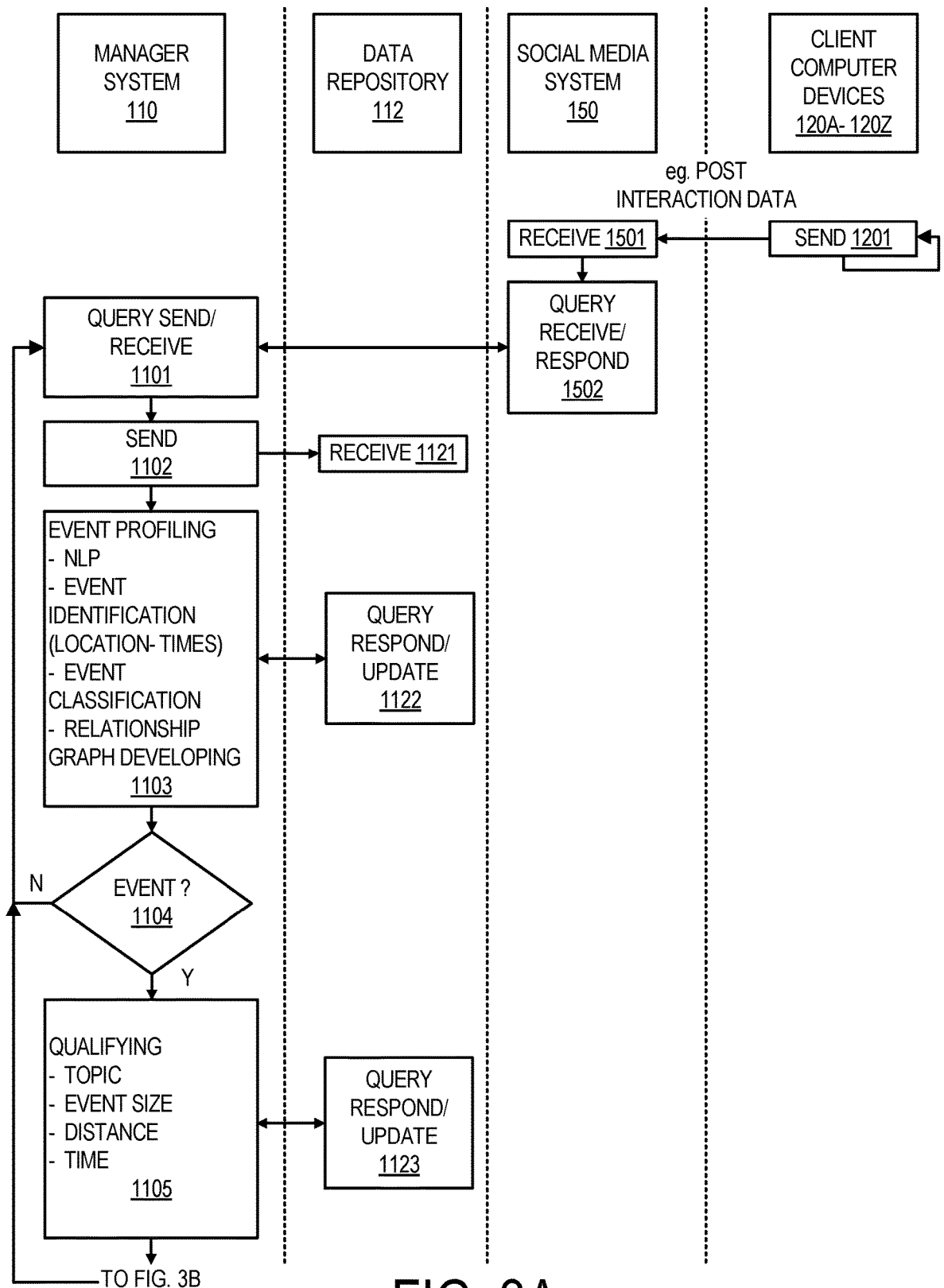
FIGS. 3A-3B are flowcharts illustrating a method for performance by a manager system interoperating with client computer devices and a social media system according to one embodiment.
Figure 3B:
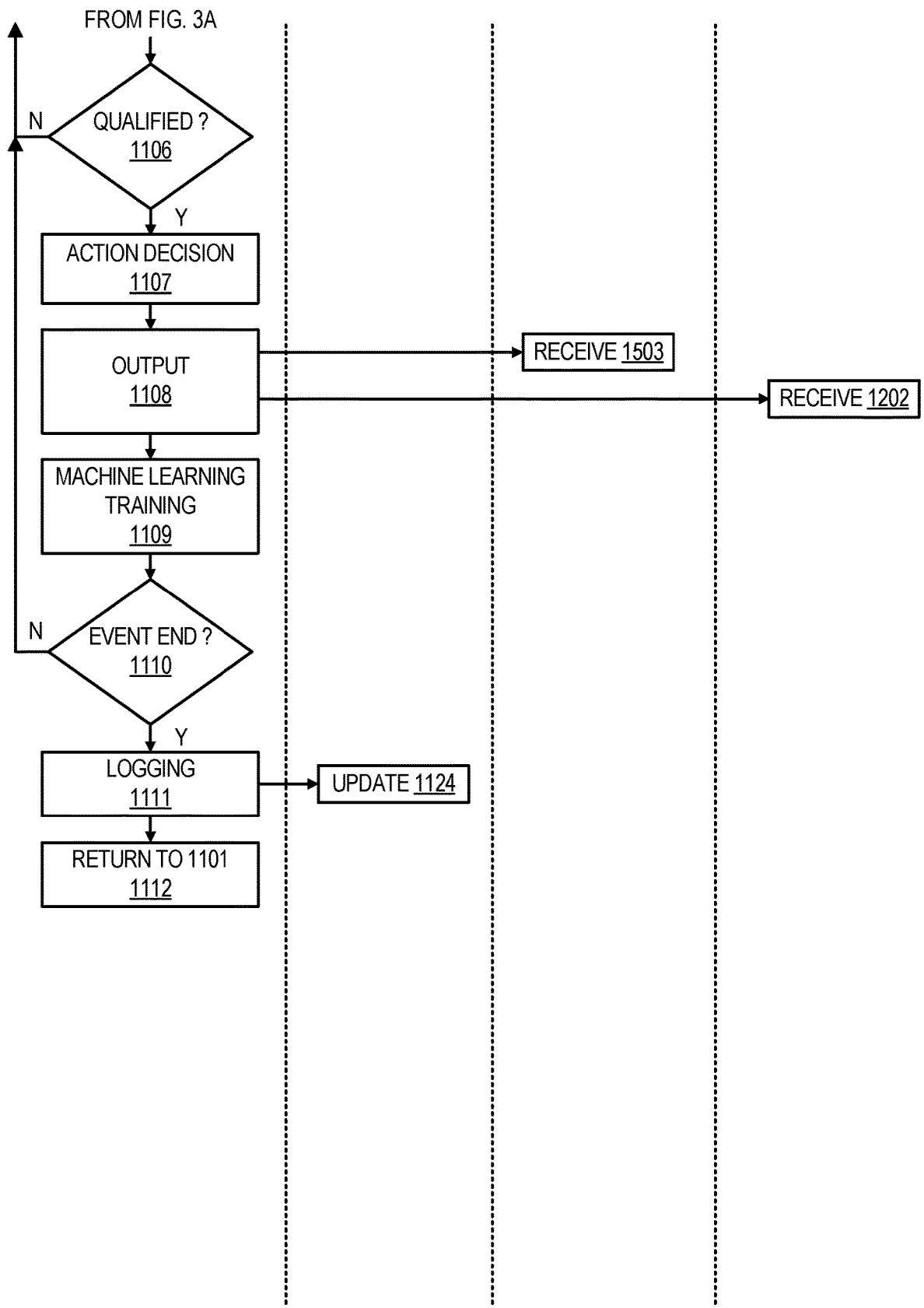

The flowchart of FIGS. 3A-3B illustrates a method for performance by manager system 110 interoperating with social media system 150 and client computer devices 120A-120Z.

Prior to block 1201 and block 1501 client computer devices 120A-120Z can send to manager system 110 user defined registration data defined by respective users of client computer devices 120A-120Z. Registration data can be data for registering respective users of client computer devices 120A-120Z as registered users of system 100. Registration data can include e.g. name data, contact data, user profile data and the like. Registration data can also include permission data e.g. permission data that grants manager system 110 right to access data of social media system 150 and right to access data of a registering user stored on a client computer device of the registering user. In response to receipt of registration data, manager system 110 can register a user as a registered user. As part of registering a user, manager system 110 can assign a universal unique identifier (UUID) for the user.

Client computer devices 120A-120Z at block 1201 can be iteratively sending post interaction data for receipt by social media system 150 at block 1501. Post interaction data can include, e.g. data that specifies an original post regarding an event, shares (reposting of the post), comments to a post, and likes of a post. An original post by a first user can specify for example, "NEW GRAD JOB FAIR AT EMPIRE CONVENTION CENTER TUESDAY THE 5$^{TH}$ 1:00 PM-3:00 PM", a second user can comment on the original post, a third user can enter a like of the post, a fourth user can share the post, and further interactions can proceed, e.g. with respect to the original post and/or with respect to the shared post which shared post can be further shared.

Manager system 110 at query send/receive block 1101 can be querying data of social media system 150 which data can be iteratively updated by the iteratively entered post interaction data sent at block 1201. Social media system 150 at query receive/response block 1502 can response to data queries of manager system 110 and can return data for examination to manager system 110 for receipt by manager system 110 at block 1101. In response to the receipt of data from social media system 150 at block 1101 manager system 110 can proceed to block 1102.

At block 1102 manager system 110 can send received social media data for storage for receipt and storage by data repository 112 at block 1121. Manager system 110 in response to completion of block 1102 can proceed to block 1103 to perform event profiling. Manager system 110 performing event profiling can include manager system 110 activating event profiling process 114 set forth in reference to FIG. 1.

Manager system 110 performing event profiling at block 1103 can include manager system 110 performing, e.g. NLP processing event identification including, e.g. event location identification and event times identification, event classification, e.g. event topic classification, and also can perform relationship graph developing as set forth herein. Manager system 110 performing event profiling at block 1103 can include manager system 110 activating NLP process 113 to segment and to return topic classifications for post content entered by users of system 100 using social media system 150. Post content can include, e.g. text and/or photographs. Manager system 110 running NLP process 113 can include manager system 110 running a text based NLP process and/or a spatial image based NLP process. Manager system 110 performing block 1103 can include manager system 110 identifying an event, e.g. by the identification of keywords and/or topics which if present within post topic indicates the existence of a planned event.

Manager system 110 performing event profiling at block 1103 can include manager system 110 performing event classification such as event topic classification. Manager system 110 performing event profiling at block 1103 can include manager system 110 using configuration data defined by an administrator user which can be defined using administrator user interface 4000 as set forth in FIG. 4.

Figure 4:
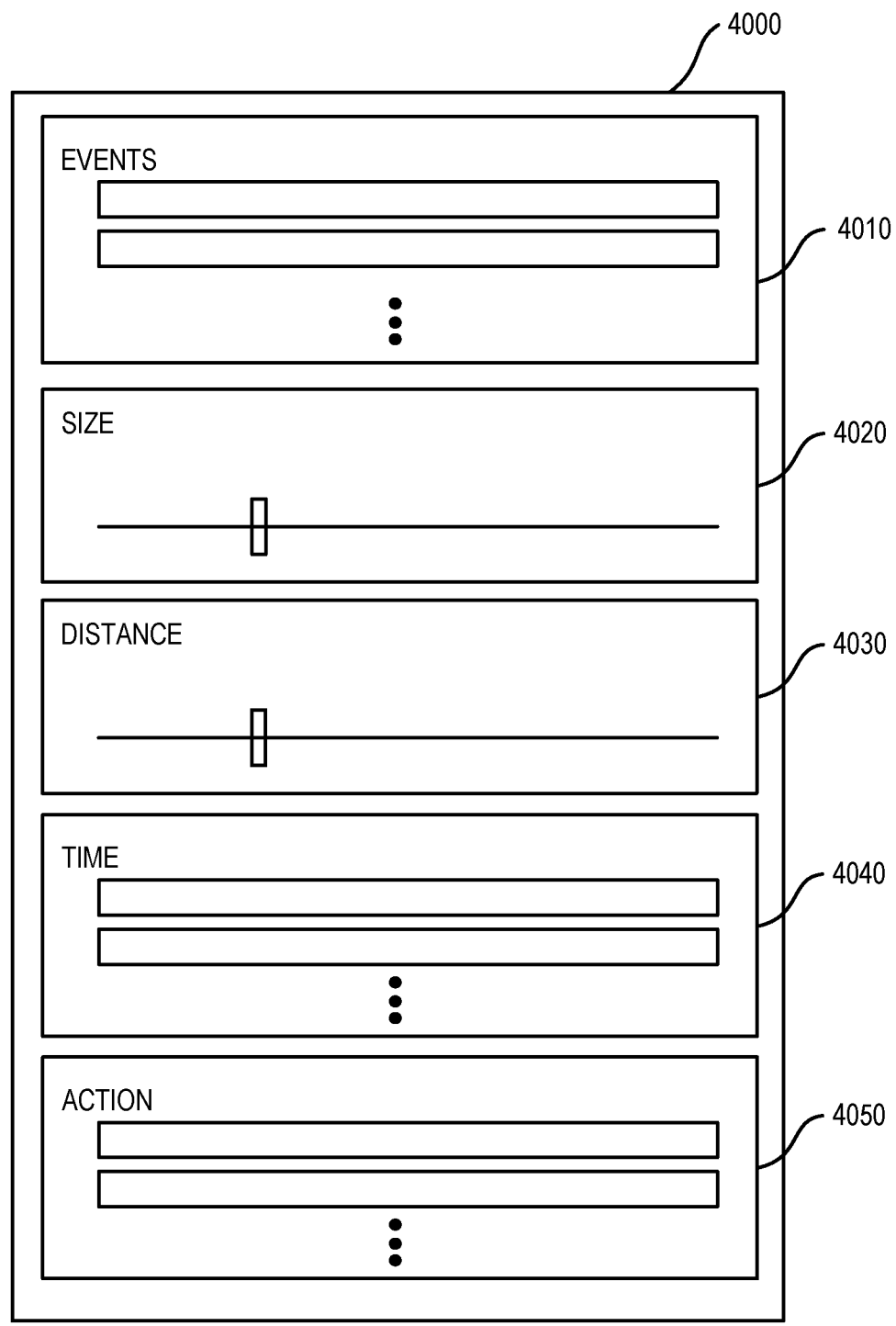
FIG. 4 depicts an administrator user interface according to one embodiment.

Administrator user interface 4000 as set forth in FIG. 4 depicts user interface for use by a service administrator user, e.g. as displayed by service administrator client computer device 125 associated to manager system 110 providing a service or user interface 4000 can be a displayed user interface for display on an enterprise client computer device 146A-146Z. In area 4010 an administrator user can specify topics and/or keywords, which if present in post content can indicate the existence of a planned event relevant to the enterprise. Topics and/or keywords that can be entered into area 4010 can include such topics as "event", "party", "gathering", "show", "fair", "celebration", and the like. Manager system 110 performing event profiling at block 1103 can include manager system 110 performing event classification using predictive model 5002. A plurality of enterprises associated to respective enterprise systems 144A-144Z can be registered subscribers of system 100 and of services provided by manager system 110. In area 4010 an administrator user can also specify event classifications relevant to the enterprise. Event classifiers can include, e.g. "GRADE SCHOOL BIRTHDAY PARTY", "RECENT GRADUATE JOB FAIR", "PROFESSIONAL CONFERENCE", "RETIREMENT PARTY", and the like.

Figure 5:
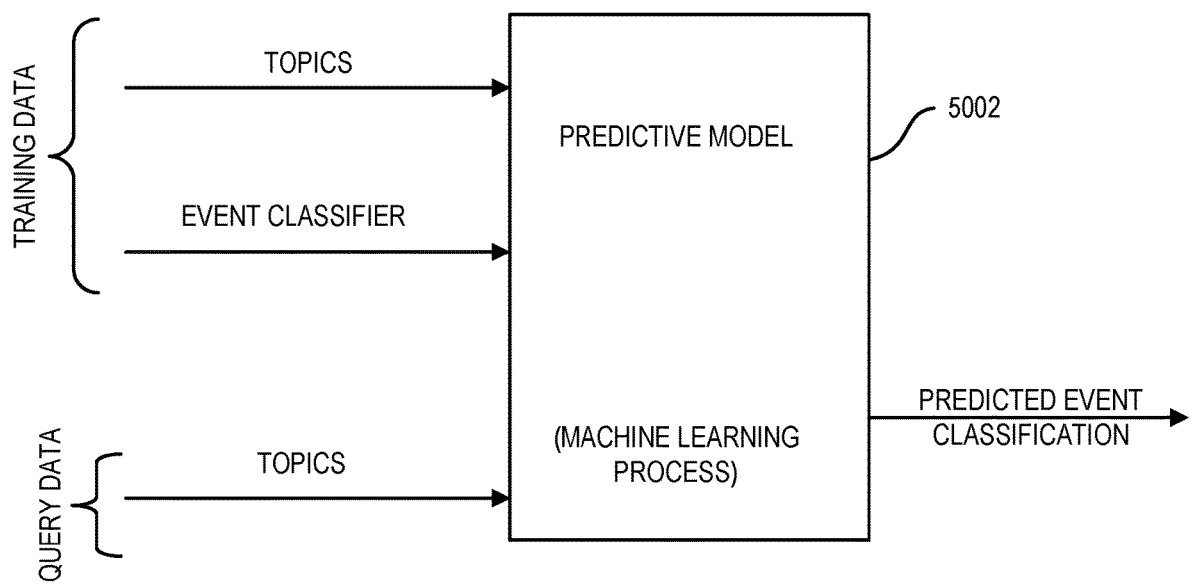
FIG. 5 depicts a predictive model trained by machine learning according to one embodiment.

Predictive model 5002 as set forth in FIG. 5 can be trained by machine learning to predict an event classification for an event based on topics returned by examination of post content data, such as post content data of an original post specifying an event and comment data to such post. Predictive model 5002 as set forth in FIG. 5 can be iteratively trained by applied training data by way of supervised machine learning. Applied training data can include, e.g. a dataset provided by topics associated to a prior event and an event classifier associated to an event. In a training phase the event classifier applied as training data can be a manually specified event classifier. Event classifiers can include, e.g. "GRADE SCHOOL BIRTHDAY PARTY", "RECENT GRADUATE JOB FAIR", "PROFESSIONAL CONFERENCE", "RETIREMENT PARTY", and the like.

Predictive model 5002 once trained by supervised machine learning can be configured to respond to query data. Query data can take the form, e.g. of a set of topics. In response to applied query data provided by a set of topics predictive model 5002 as set forth in FIG. 5 can return a predicted event classification. Accordingly, at block 1103 manager system 110 can return a current event classification for an identified event. For returning an event classification for a currently identified event, manager system 110 can apply as query data a set of topics returned by subjecting post content to NLP processing to return topic classifiers for the post content.

Manager system 110 according to one embodiment can use a variety of predictive models for improved performance of manager system 110. As set forth in FIG. 6, manager system 110 can apply predictive model 6002 for predicting an attendance or nonattendance of a certain user with respect to an identified event. Predictive model 7002 as set forth in FIG. 7, can be used to predict a number of attendees at an event. Predictive model 6002 and predictive model 7002 are described in further detail herein.

Figure 8:
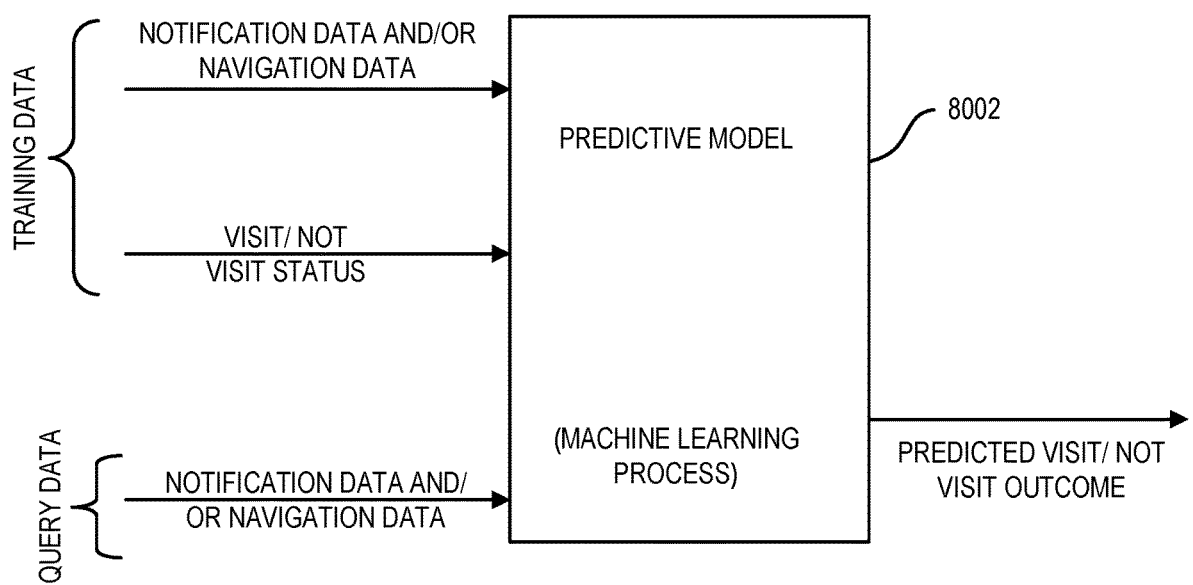
FIG. 8 depicts a predictive model trained by machine learning according to one embodiment.
Figure 9:
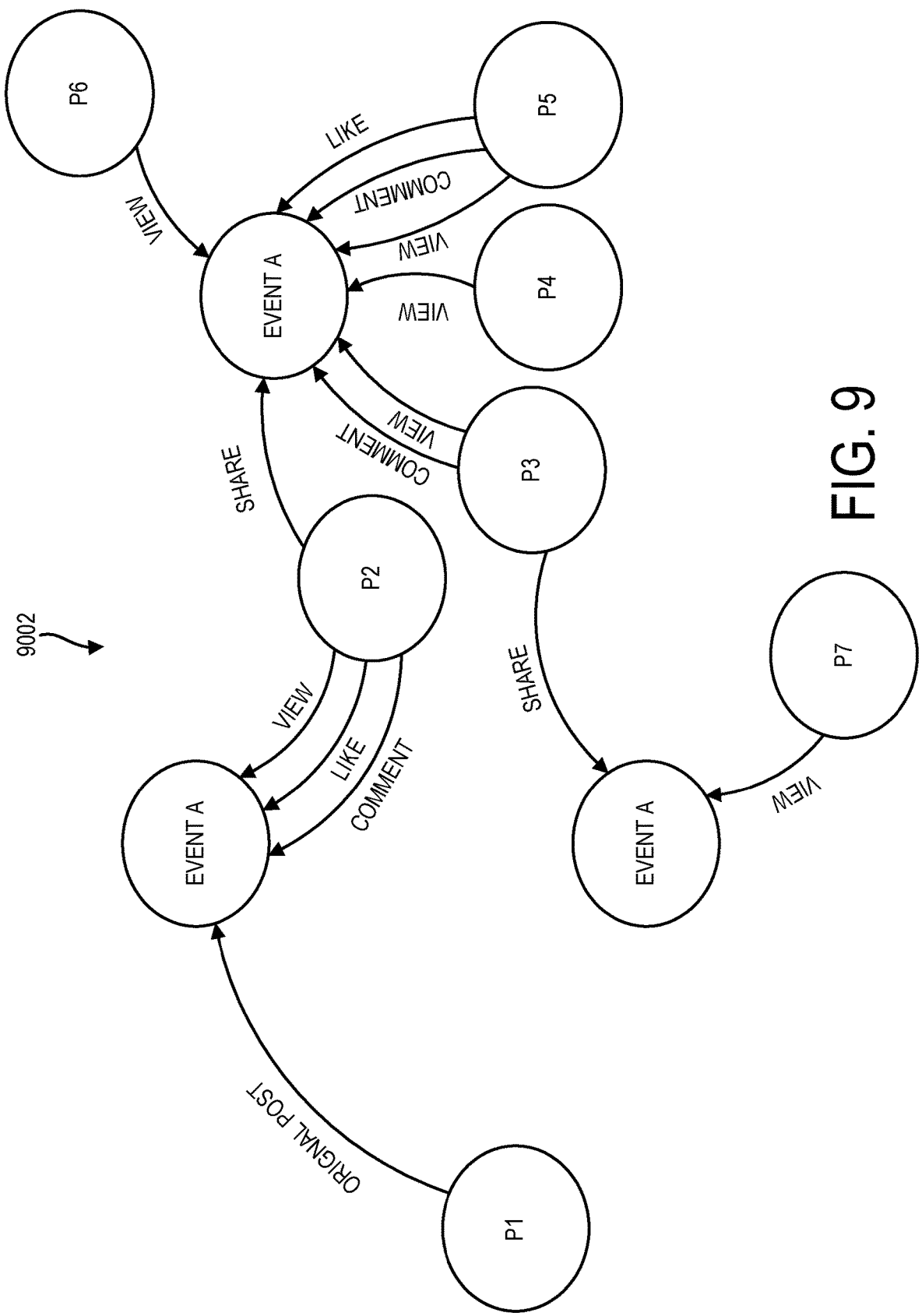
FIG. 9 depicts a relationship graph data structure according to one embodiment.

Manager system 110 at block 1103 can establish and/or update a relationship graph that profiles a currently identified event. A relationship graph characterizing a currently identified event is depicted in FIG. 9. Referring to FIG. 9, relationship graph 9002 includes nodes provided by user nodes P1-P7 and post nodes. The edges between nodes depict a particular user's interaction with a certain post. As specified in relationship graph 9002 depicted in FIG. 9, user P1 can be an original poster who enters a post specifying event A, e.g. RECENT GRADUATE JOB FAIR AT EMPIRE CONVENTION CENTER, TUESDAY, THE 5$^{TH}$, 1:00 PM-3:00 PM. User P2 views the original post, likes the original post, comments on the original post, and shares the original post to repost the post. Users P3-P6 view the shared post reposted by user P2. User P3 comments on the shared post posted by user P2 and user P5 likes and comments on the shared post posted by user P2. User P3 further shares the post and user P7 views the shared post reposted by user P3. Relationship graph 9002 defines a data structure that can iteratively evolve as new users interact with post content specifying a planned event. The data structure provided by relationship graph 9002 as depicted in FIG. 8 reduces resource utilization as it avoids a need to iteratively re-query data of a storage database for iteratively relearning of previously discovered relationships. Manager system 110 for obtaining data specifying interactions of users with posts e.g. in connection with determining relevance or returning actions decisions as set forth in connection with Tables A-E can query relationship graph 9002. Relationship graph 9002 can be configured as a lightweight data structure and can be readily ported between computing nodes. According to one embodiment, relationship graph 9002 can be encoded in a markup language document.

Manager system 110 on completion of block 1103 can proceed to block 1104. At block 1104, manager system 110 can determine whether an event has been identified. If an event has not been identified, manager system 110 can return to block 1101 to receive data from social media system 150 and can then continue with the loop depicted at blocks 1102-1104 until an event is identified. Where manager system 110 at block 1104 determines that an event has been identified, manager system 110 can proceed to block 1105 to perform qualifying. Manager system 110 at block 1105 can perform qualifying for each of several different enterprises, each of whom can specify different qualifying one or more criterion. Where qualifying one or more criterion are satisfied, manager system 110 can proceed to take action at action decision block 1107 in response to performing of block 1106 where manager system 110 determines whether qualifying one or more criterion have been satisfied.

Use of system 100 in enterprise venue such as enterprise venue 140A as depicted in FIG. 1 may or may not want to take action with respect to an identified event, which can be nearby the enterprise venue. Actions that can be taken on behalf of and enterprise with respect to an event can include, e.g. actions to send notifications to users attending or accepting an invite to an identified event so that such users flow to an enterprise venue of the enterprise. Manager system 110 performing qualifying at block 1105 can include manager system 110 activating qualifying process 115 as set forth in FIG. 1.

Manager system 110 performing qualifying at block 1105 can include examining various factors, e.g. a topic factor wherein manager system 110 can match topic associated to items available at an enterprise venue to topics that are associated to users interacting with an identified planned event; an event size factor, wherein manager system 110 can predict a size of an event, e.g. based on an examination of post content data; a distance factor, i.e. how far an event identified by examining of social media data is with respect to an enterprise venue of an enterprise; and a time factor, e.g. whether current time is an appropriate time for taking action.

According to one embodiment, manager system 110 performing qualifying at block 1105 can include manager system 110 applying the function as set forth in Eq. 1 herein below.

$$S=F_1W_1+F_2W_2+F_3W_3+F_4W_4+F_5W_5 \quad \text{(Eq. 1)}$$

Where S is a scoring value that specifies a relevance of an identified planned event to an enterprise, where $F_1$ is an event classification factor, $F_2$ is a topic matching factor, $F_3$ is a size factor, $F_4$ is a distance factor, and $F_5$ is a time factor, and $W_1$-$W_5$ are weights associated with the various factors $F_1$-$F_5$.

Manager system 110 can assign values under topic value $F_1$ in dependence on event classifications entered into area 4010 by an enterprise administrator user specifying event classifications regarded by an enterprise to be relevant to the enterprise. Manager system 110 can assign a higher scoring value under factor $F_1$ in the case that returned event classification of an event was specified by an administrator user and can assign a lower scoring value under factor $F_1$ in the case that returned event classification of an event was not specified by an administrator user using area 4010.

Manager system 110 can assign values under topic value $F_2$ in dependence on a topic matching a topic of items available at an enterprise venue and a topic of preferences of users interacting with an event. For generating a topic data set specifying topics associated with an enterprise venue, manager system 110 can activate NLP process 113 to examine text based descriptions of inventory available at an enterprise venue. An inventory can include e.g. a set of physical item inventory and/or services inventory. Text based descriptions can include descriptions of physical inventory items in the case of a retail store, or text-based descriptions of services where an enterprise venue is provided by an entertainment venue, or professional services, e.g. tax, legal, etc. venue. The topics can be weighted based on a volume of inventory available.

Manager system 110 can generate a topic dataset for an identified event by examining preferences of users interacting with an event virtually using social media system 150. Manager system 110 can determine a set of preferences for a user by examining an overall set of post content of a particular user, e.g. involving or not involving an identified event and can subject to such post content to processing by activating of NLP process 113 to return a set of topics that specify preferences of a particular user. Topics that are associated to an identified event can be weighted based on a level of interaction of a user in respect to an identified event.

Individual users level of interaction with an identified event can be scored using a scoring system as set forth in Table A, wherein points are assigned based on a user's interaction with events specifying post content.

TABLE A

| Interaction | Score |
|---|---|
| Original Post | 5 |
| Share | 4 |
| Comment | 3 |
| Like | 2 |
| View | 1 |
| ... | ... |

As set forth in Table A, a user can be assigned a score of 5 for original post specifying an event, 4 points for sharing such post, 3 points for commenting on such post, 2 points for liking such post, and 1 point for viewing such post. Manager system 110 providing a topic dataset for an event can include manager system subjecting text based post content specifying an event to processing by NLP process 113 to return topic classifiers for post content specifying an event. Additionally or alternatively, manager system 110 providing a topic dataset for an event can include manager system 110 aggregating topics of users associated to an event (e.g. users who have interacted with an event virtually by posting and/or physically by attending). In performing aggregation of preference topics manager system 110 can apply weights based on a user's interaction with an event. Manager system 110 can return a set of topic preferences for a user of {hiking=0.7, outdoors=0.8, retirement planning 0.8}. Manager system 110 can scale the user's preferences by a factor of 5× according to Table A where the user is an original poster, and by a scale of 3 where the user viewed (1 point) and liked (2 points) a post specifying an event.

Manager system 110 can provide a dissimilarity score between topic dataset associated to an enterprise venue and a topic dataset associated to an identified planned event identified by examining data of social media system 150. Manager system 110 can assign higher values under factor $F_2$ where topic dataset of an enterprise venue is more similar to a topic dataset of an identified event and can assign relatively lower values according to factor $F_2$ where a topic dataset of an enterprise venue is less similar to a topic dataset associated to users interacting with post content associated to a planned event.

Manager system 110 can assign a relatively higher value according to factor $F_3$, size, where manager system 110 predicts a larger size of an event, e.g. in terms of user attendance and can assign a relatively lower value according to factor $F_3$ where manager system 110 predicts a smaller attendance of an event. Embodiments herein recognize that to an enterprise, a benefit associated with taking action in response to an identified planned event identified by examining social media data can potentially not be worth the cost where an event is too small. Accordingly, factor $F_3$ is a factor which results in a lowering of a relevant scoring of an event in dependence on attendance size. For predicting a live attendance of an event, manager system 110 can user one or more predictive model such as predictive model 6002 as set forth in FIG. 6 and predictive model 7002 as set forth in FIG. 7.

Figure 6:
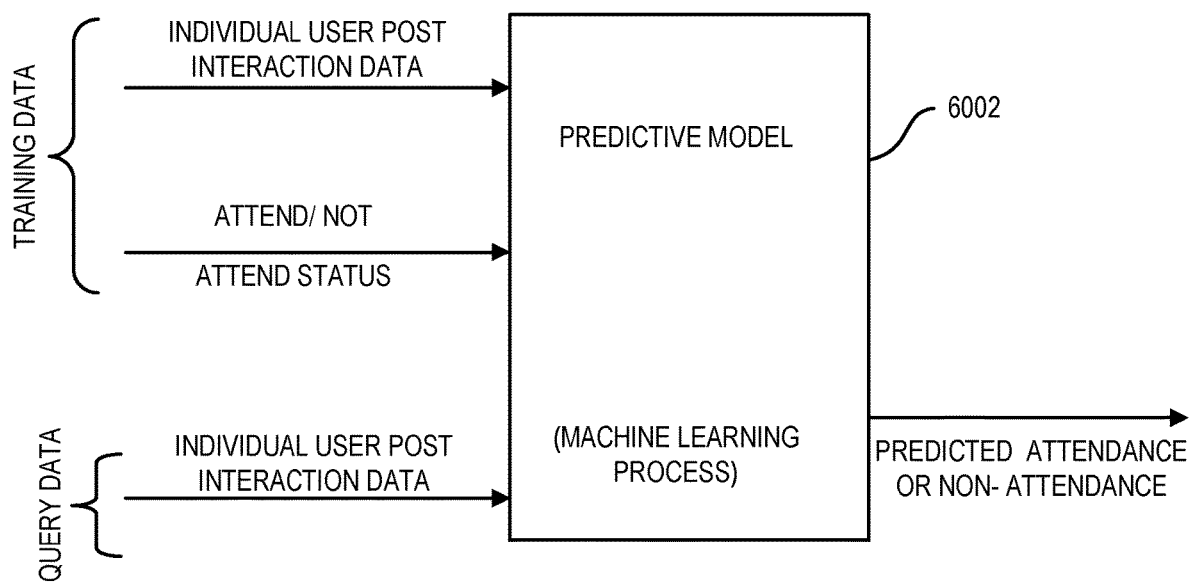
FIG. 6 depicts a predictive model trained by machine learning according to one embodiment.
Figure 7:
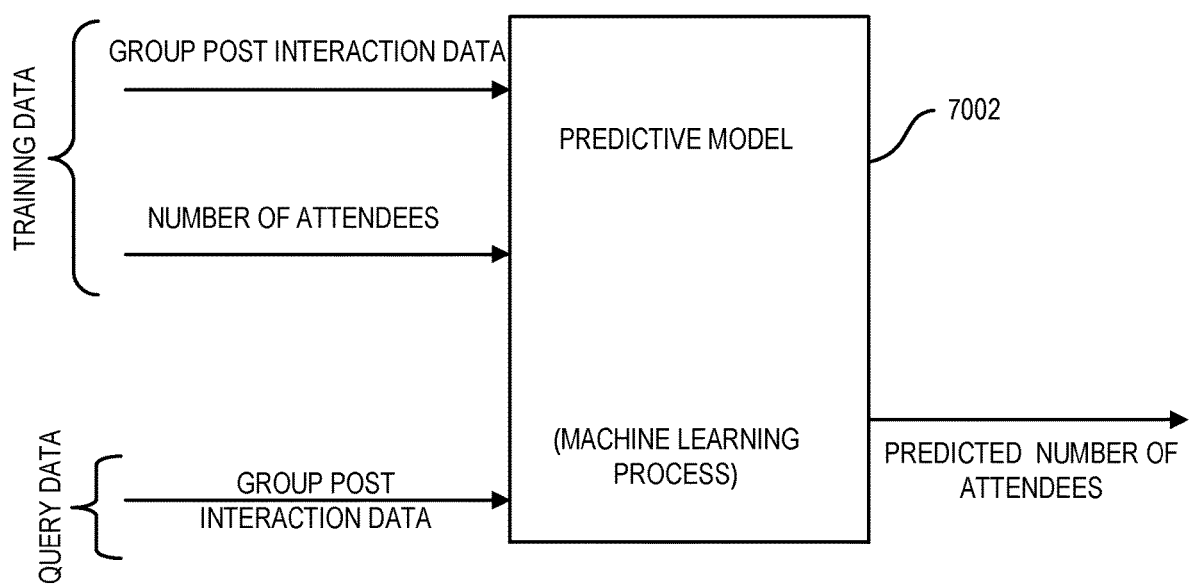
FIG. 7 depicts a predictive model trained by machine learning according to one embodiment.

Predictive model 6002 as set forth in FIG. 6 can be iteratively trained using a supervised machine learning process. Predictive model 6002 can predict an individual user's attendance or nonattendance of a planned event, based on post interaction data of the user with respect to an identified event. Predictive model 6002 can be iteratively trained using training data. Training data that can be iteratively trained to train predictive model by supervised machine learning can include individual user post interaction data associated with actually observed attended/non-attended of that user with respect to an identified event. Predictive model 6002 is able to learn an individual user's behavior expressed by attendance or nonattendance of a live event in dependence on that user's pre-event post interaction data. Predictive model 6002, once trained using training data as described herein is able to respond to query data. Query data applied to predictive model 6002 can include query data that specifies an individual user's pre-event post interaction data, e.g. an individual user's history of post interactions with respect to an identified event specified in a post. In respect to relationship graph 9002 depicted in FIG. 9, the post interaction data of user P3 for example can include interaction data specifying that the user has viewed the shared post of user P2 and has commented on the shared post of user P2 and has also shared the shared post of user P2. In response to being queried with query data, predictive model 6002 can output a prediction as to a certain user's attendance or nonattendance of an event. Manager system 110 can instantiate an instance of predictive model 6002 for each user interacting with post content that specifies a planned event identified by manager system 110. For predicting live attendance of a planned event identified by examining social media data, manager system 110 can in addition or alternatively use predictive model 7002 as specified in FIG. 7.

Predictive model 7002 can be trained using a supervised machine learning process to be capable of predicting a number of attendees attending a live event based on post interaction data of a group of users. Manager system 110 according to one embodiment can instantiate N instances of predictions of predictive model 7002, one for each event classification of an event. Predictive model 7002 can be iteratively trained by applying training data to predictive model. Instances of training data can include for each of a sequence of events, group post interaction data associated to number of actual live attendees associated to an event. The applied group post interaction data can be pre-event post interaction data specifying post interaction of all users interacting with a post that specifies an event, e.g. with reference to the described example set forth in FIG. 8, can specify post interaction data of all users P1-P7 and all additional users as the post interaction activity expands. Predictive model 7002 once trained, is able to respond to query data to return an output provided by a predicted number of attendees of an event. Query data applied to predictive model 7002 can include, according to one embodiment, pre-event group post interaction data for an event that has been identified but which has not yet occurred. Manager system 110 using predictive model 7002 can predict a number of attendees who will attend an identified event in person based on current group post interaction data, which can be applied as query data to predictive model 7002.

Manager system 110 can assign a relatively high value according to factor $F_4$, distance, where an identified planned event is relatively close to an enterprise venue and can assign a relatively low value according to factor $F_4$, distance, where an identified event is relatively farther from an enterprise venue. According to one embodiment, manager system 110 can assign a value according to factor $F_4$ that is inversely proportional to a distance between and identified event venue and an enterprise venue operated by an enterprise. Thus, yielding an overall relevance scoring value S that is higher for closer event venues and lower for event venues that are farther away from an enterprise venue.

Manager system 110 can assign a value according to factor $F_5$, timing, in dependence on time data that can be configured by an administrator user, e.g. a service administrator user or an enterprise administrator user. An administrator user can specify time windows at which action with respect to an identified planned event can be expected to be particularly productive. A common time window can be, e.g. a day before the event, a time window on the day of event but before the event, or a time window comprising within a time period of a planned event. Manager system 110 can assign relatively higher values according to factor $F_5$ where a current time is within a specified time window and can assign a relatively low value (e.g. according to one embodiment, a null value) where a current time is outside of a specified time window. According to one embodiment, specified time windows specified by an administrator user as time window productive for taking action can be disabled in response to an action being taken within the time window.

Manager system 110 performing block 1105 can include manager system 110 examining configuration data, e.g. entered by an enterprise administrator user using user interface 4000 as depicted in FIG. 4. Manager system 110 at block 1105 can be examining criterion specified by administrator users of multiple different enterprises having multiple different respective enterprise venues. As explained previously an administrator user can use area 4010 to specify, e.g. keywords and/or topics which when present in post content indicates existence of a planned event.

An administrator user using area 4020 can specify such criterion as size threshold, the size specifying a predicted number of attendees regarded by an enterprise as being sufficient for the enterprise to take action with respect to an identified event. An administrator user using area 4030 can specify a distance threshold, specifying an enterprise venue to event venue threshold distance within which an enterprise regards taking action with respect to an identified event being productive. Manager system 110 applying Eq. 1 can apply the criterion specified by an enterprise administrator user using user interface 4000 can apply Eq. 1 differently for different enterprises in dependence on the different criterion specified. An administrator user using area 4040 can specify relevant times with respect to an identified planned event can specify relevant time windows regarded by an enterprise to be productive taking action with respect to an identified event. For example, using area 4040 an enterprise administrator user can specify a time window occurring during a day prior to a day of an event as a relevant time window. Using area 4040, an enterprise administrator user can specify a time window occurring on a day of an event but prior to an event as a time window to take action. Using area 4040, an enterprise administrator user can specify a time window occurring during the occurrence of an event as a time window to take action.

An administrator user using area 4050 can specify attributes of an action to be taken with respect to an identified event identified by examination of social media data.

With reference to Eq. 1, manager system 110 according to one embodiment can apply factor $F_4$ which is a distance factor in dependence on a distance between an enterprise venue and an event venue identified by manager system 110 by examination of social media data. Manager system 110 can assign scoring values under factor $F_4$ in dependence on distance of an event venue to an enterprise venue and in dependence on administrator use defined data entered into area 4030. According to one embodiment manager system 110 at qualifying block 1106 can use Eq. 1 which can return a result in dependence on a variety of factors including distance factor $F_4$.

According to one embodiment manager system 110 at qualifying block 1106 can disqualify the taking of action in respect to an identified event in dependence on geofence processing. Geofence processing for qualifying or disqualifying action in respect to an identified planned event is described in reference to FIG. 10.

Figure 10:
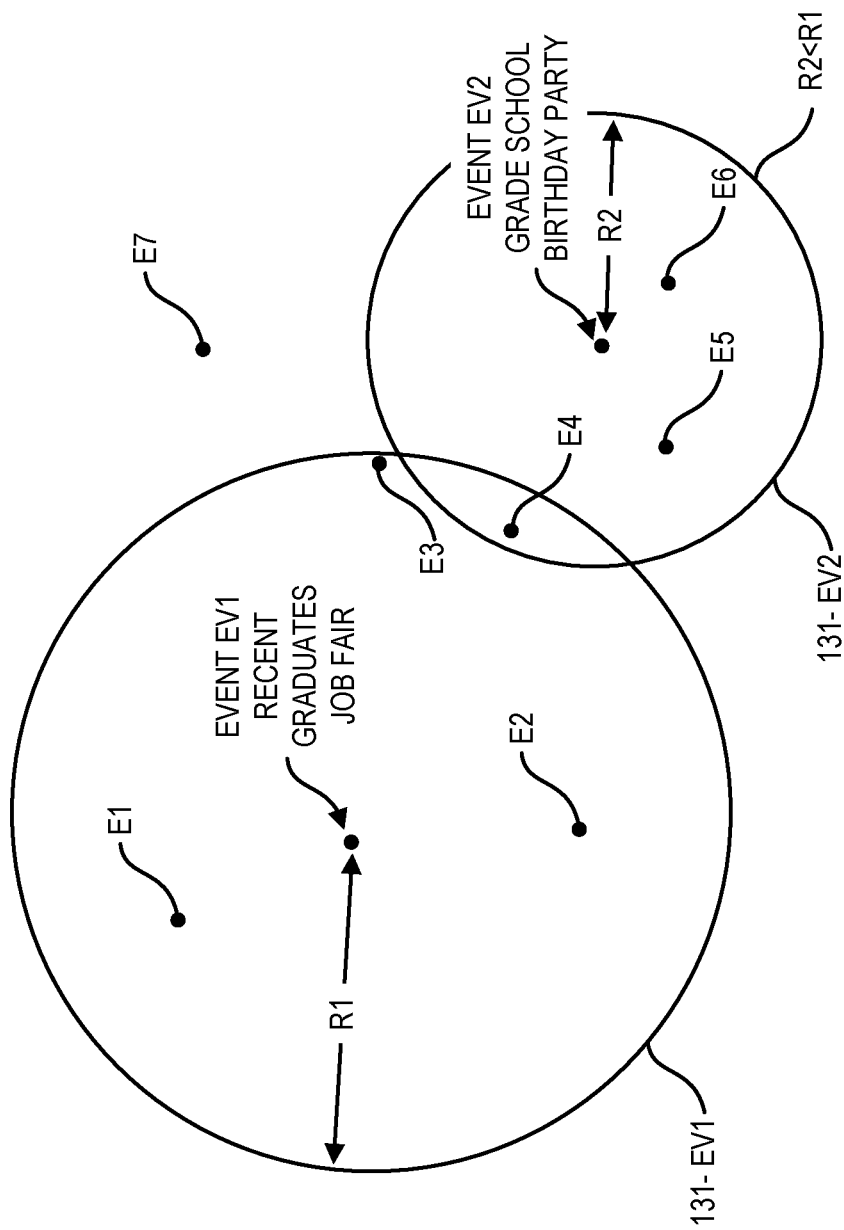
FIG. 10 depicts geofence processing according to one embodiment.

FIG. 10 depicts an environment defined by the spatial area including a plurality of event venues, e.g. event venues EV1 and EV2 and a plurality of enterprise venues E1-E6. According to one embodiment, manager system 110 at block 1105 can qualify or disqualify action with respect to an identified event in dependence on whether an enterprise venue being evaluated for action taking is outside of a geofence. In the embodiment described in reference to FIG. 10 manager system 110 can determine that an event at an event venue is relevant to an enterprise if a described geofence about an event venue encompasses an enterprise venue of the enterprise and manager system 110 can determine that an event at an event venue is not relevant to an enterprise if a described geofence about an event venue does not encompasses an enterprise venue of the enterprise. Further in respect to FIG. 10, it is shown that manager system 110 can define a geofence in respect to an event venue that is in dependence on an event classification. Manager system 110 with reference to FIG. 10 can define geofence 131-EV1 about event venue EV1 and geofence 131-EV2 about event venue EV2. Geofence 131-EV1 is provided by a circular perimeter spaced a radius distance R1 from a location of event venue EV1, whereas geofence 131-EV2 is provided by a circular perimeter spaced a radius distance R2 from a location of event venue EV2. In the described example R2 is less than R1. Manager system 110 can specify geofence 131-EV2 to have a smaller radius than geofence 131-EV1 in dependence on an event classification.

Embodiments herein can assign demographics in dependence on returned event classifications. In the described event example, the event associated with event venue EV2 is a grade school birthday party and the event associated with the event venue EV1 is a recent graduate job fair. Manager system 112 can assign to event venue EV2 first demographic datasets such as children and guardian demographic datasets. Manager system 112 can assign to event venue EV2 first demographic datasets such a recent graduates demographic dataset. Embodiments herein recognize that it can be advantageous to establish a geofence radius in dependence on an event classification given that different types of users associated with the different types of event classifications can have different travel habits, e.g. in the described example, recent graduates according to one embodiment can be expected to have a greater degree of mobility and access to remote locations than users associated with a grade school birthday party, e.g. guardians of children and children.

In the example depicted in reference to FIG. 10, geofence processing described results in enterprise venues E1-E4 being qualified for action with respect to event venue EV1, results in enterprise venues E4-E6 being qualified for action with respect to event venue EV2, and results in enterprise venue E7 being disqualified for action with respect to each of the events associated with event venues EV1 and EV2. Based on geofence processing, enterprise venue E3 can be qualified for action with respect to event venue EV1 and may not be qualified for action with respect to event venue EV2 even though enterprise venue E3 is closer in distance to event venue EV2 than event venue EV1. Enterprise venue E7 is external to the geofence associated to event venue EV1 and the geofence associated to the event venue EV2. According to the geofence processing set forth in FIG. 1, enterprise venue E7 will not be qualified for action in respect to either event venue EV1 or event venue EV1.

At blocks 1103 and 1105 manager system 110 can make multiple queries to data repository 112. Data repository 112 can respond to such queries at blocks 1122 and 1123 respectively. At blocks 1103 and 1105, manager system 110 can also send data value updates, e.g. updates specifying returned NLP derived topics, data on identified event classifications, data on updated relationship graphs, and data qualifying processing. Data repository 112 can perform data updates in response to such sending of updated data at blocks 1122 and 1123 respectively. Manager system 110 in response to completion of block 1105 can proceed to block 1106.

At block 1106, manager system 110 can determine whether an identified planned event is qualified for an enterprise taking action in respect to the identified event. For performing block 1106, manager system 110 can determine whether a relevance score S (Eq. 1) exceeds a threshold such as a predetermined or dynamically determined threshold. In response to a determination that an identified event is not qualified for an enterprise taking action in respect to the event, manager system 110 can return to block 1101 to continue to receive and process data of social media system 150 and ensuing blocks 1102-1106. In response to a determination that an identified event is qualified for an enterprise taking action in respect to the event, manager system 110 can proceed to block 1107.

At block 1107, manager system 110 can return an action decision that specifies one or more action to be taken by an enterprise in respect to an identified event. Manager system 110 according to one embodiment, identified event is qualified for an enterprise taking action in respect to the event, can responsively send return action decisions specifying sending of communications to all users of an event interacting with an event e.g. virtually or physically by attending. Using decision data structures as set forth herein, e.g. in reference to tables B, C, D, and E, manager system 110 can differentiate communications between users in dependence on interactions of users with an event. Manager system 110 performing action decision 1107 can include manager system 110 using a decision data structure. Exemplary decision data structures that can be used by manager system 110 are set forth in Tables B, C, D, and E herein. System 100 can be configured so that when an action decision is returned, the action associated to the action decision is responsively performed. System 100 can be configured so that if action decision 1107 is not triggered (N path from block 1106 is performed) manager system 110 can send notification data to enterprise systems 144A-144Z for viewing by administrator users of enterprise administrator client computer devices 146A-146Z. The notification data can include text based data specifying the returned results of processing at block 1103, block 1104 and block 1105. An administrator can optionally manually override "qualified?" decision block 1106 on review of the returned notification data, e.g. wherein an event is specified in the notification data of particular relevance to an enterprise.

TABLE B

| Row | Activity Level | Action Decision |
|-----|----------------|-----------------|
| 1 | 1 | A |
| 2 | 2 | B |
| 3 | 3-4 | C |
| 4 | 5-8 | D |
| 5 | 9+ | E |
| ... | ... | ... |

Referring to Table B, the decision data structure of Table B cognitively maps activity levels of users interacting with an identified event with actions associated with different levels of interactions. According to one embodiment, differentiated levels of interaction can be provided using a scoring system as set forth in Table A, wherein a user is assigned point scoring values in dependence on types of interactions with post content that specifies an event. For example, as depicted in Table A, a user can be assigned a score 5 for an original post, 4 for a share of a post, 3 for a comment on a post, 2 for liking of a post, and 1 for viewing of a post. The points can be combined. For example, if a user views, likes, comments, and shares a post that can return a value of 4+3+2+1=10. Referring to Table B, activity level scores can be returned for each user interacting with post content, higher scores indicating a higher level of activity. As set forth in Table B, activity levels can range from an activity level 1 to an activity level 5 with point ranges associated with each activity level.

Manager system 110 can return for each user an action decision in dependence of an activity level of a user. According to one embodiment, different notifications can be associated to each activity level. Action decisions can specify, e.g. notification data for defining a notification that can be sent to a user and/or can specify navigation data for sending to a user for navigating a user to a venue and/or to a particular location within a venue. Action decisions according to one embodiment can include action decisions to initiate a machine learning process such as a process to track an outcome of an action decision and to use such outcome as machine learning training data. Navigation data when run by a receiving client computing device can navigate a user to an enterprise venue e.g. by providing of directional prompts (turn left, turn right, etc.) or navigation data can be provided to navigate a self-driving vehicle to automatically drive to an enterprise venue. Navigation data according to one embodiment can interact with navigation software running on a client computer device. For example, navigation data can comprise a destination data value for input into and receipt by navigation software which returns directional prompts in response to the destination data. In another embodiment, navigation data can include directional prompts as determined by navigation software running on manager system 110.

Referring again to Table B, action decisions A, B, C, D, and E can be differentiated. For example, action decision A can include action specifiers that specify the sending of navigation data for navigating a user to a venue and/or to a particular location within a venue and action decision D can be without any navigation data (for example, it may be expected that less active users have less of a need for navigation). According to one embodiment, each action decision A-E can include an action that specifies that a notification be sent to a user. However, the notifications can be differentiated in dependence on a returned activity level. For example, to reward users for being more active notification differentiation can take the form of differences in text based promotions, whereby a more active user is presented with a higher value promotion than a less active user. For example, a user with an activity level of 5 can be presented with a 30% discount and a user with an activity level of 1 can be presented with a 10% discount. An action decision associated to a user with an activity level of 1 can include an action decision specifying the sending of navigation data by navigation data to navigate a user to a venue but can be absent of navigation data to navigate a user to a specific location within a venue. An action decision associated with a user of activity level 2 can include navigation data to navigate a user to a location as well as guided tour navigation data to guide a user to a specific location within a venue. An alternative action decision data structure is depicted in Table C.

TABLE C

| Row | Event Role | Action Decision |
| --- | --- | --- |
| 1 | Original Promoter | AA |
| 2 | Sharer-Influencer | BB |
| 3 | Sharer | CC |
| 4 | Commenter | DD |
| 5 | Liker | EE |
| 6 | Viewer | FF |
| 7 | Original Promoter - Acceptor | GG |
| 8 | Sharer - Influencer Acceptor | RH |
| 9 | Sharer Acceptor | II |
| 10 | Commenter Acceptor | JJ |
| 11 | Liker Acceptor | KK |
| 12 | Viewer Acceptor | LL |
| ... | ... | ... |

With reference to Table C, action decisions can be in dependence on specific roles played by a user in respect to interactions with post content specifying an identified event. The roles specified in Table C can be the latest role played by a user in respect to post content. For example, if a user at a first time likes a post, but later comments on the post the user is regarded to be a "commenter". In accordance with Table C, action decisions can be in dependence on roles played by a user when interacting with post content. Action decisions AA-LL can each include an associated notification. However, the notifications can be differentiated between the action decisions. For example, a user classified as an original promoter can be presented a notification that specifies new product being launched, whereas a user classified as a viewer can be presented with an alternative notification specifying a legacy product being promoted.

As set forth in Table C, a user can be classified as a "share influencer". A user can be classified as a "share influencer" when a shared post received more than a threshold amount of activity interactions from other users. For example, a sharer can be assigned influencer status when more than N other users view the shared post of the sharer. According to action decision BB or HH an action decision associated to a share influencer can include a text based notification notifying of a special promotion optimize for sending to an influencer, such as a promotion offering a maximum discount or a promotion offering free training with respect to an item, e.g. product or service. Action decisions can be differentiated among classifications in terms of navigation data that is sent. An action decision associated to an original promoter can be absent of navigation data. An action decision associated with a viewer can include navigation data provided by navigation data that navigates a user to a venue as well as guided tour navigation data that navigates a user to a specific location within a venue. Navigation data of an action decision associated to a "liker" can include navigation data that navigates a user to a venue but is absent of guided tour navigation data that navigates a user to a specific location within a venue.

Referring further to Table C, action decisions can be differentiated further in dependence on whether a user is classified as an "acceptor" or not. An "acceptor" herein, is a user who accepts an invitation to attend an event. According to one embodiment, an invitation and an acceptance of an invitation can be expressed, e.g. post content can include a registration portal allowing a user to register as an attendee. According to another embodiment, an invitation and an acceptance of an invitation can be inferred, e.g. by comment data entered by a user in response to a post specifying an event, e.g. comments having text that affirmatively indicate that the user intends to attend, e.g. "I will see you there" and the like. According to another embodiment, an acceptor status can be assigned based on a result of querying a predictive model that predicts a user's attendance in dependence on post interactions, such as predictive model 6002 as shown in FIG. 6. According to one embodiment, users classified as acceptors can be provided with navigation data that defines a reduced level of service relative to navigation data provided by a user not classified as an acceptor. According to one embodiment, "non-acceptors" can be given differentiated notification data, e.g. notification data specifying promotions of greater value than as specified by notification data presented to acceptor users to thereby provide further incentive for non-acceptor user to travel to an enterprise venue.

Notifications associated with action decisions of Tables B and C can include text based data to direct a user to travel to a certain enterprise venue. Tables B and C are tables for return of action decisions in the case of a time window prior to a time period of an identified event, e.g. during a time when a time window occurring, during a day prior to the event, or on the day of the event prior to the event. Tables D and E set forth decision data structures for return of action decisions in the case a time window occurs during a time period of an identified event identified by examining of social media data.

TABLE D

| Row | Activity Level | Action Decision |
| --- | --- | --- |
| 1 | 1 | AAA |
| 2 | 2 | BBB |
| 3 | 3-4 | CCC |
| 4 | 5-7 | DDD |
| 5 | 8+ | EEE |
| ... | ... | ... |

TABLE E

| Row | Event Role | Action Decision |
| --- | --- | --- |
| 1 | Original Promoter Attendee | AAAA |
| 2 | Sharer-Influencer Attendee | BBBB |
| 3 | Sharer Attendee | CCCC |
| 4 | Commenter Attendee | DDDD |
| 5 | Liker Attendee | EEEE |
| 6 | Viewer Attendee | FFFF |

Embodiments herein recognize that it can be advantageous to differentiate action decisions. For example, navigation data that is sent can be differentiated by including navigation data for navigating a user from a location of an event venue to an enterprise venue. Notification data of differentiated action decisions can be differentiated as well, from notifications associated to a pre-event time window. For example, during event notifications can be directed to short term need items of a user rather than long term item needs of a user as may be specified in a pre-event notification and may relate, e.g. to food or drink items that may be desirable for a user to consume on a current need basis.

Manager system 110 in response to completion of block 1107 can proceed to block 1108. At block 1108, manager system 110 can provide one or more output to provide one or more action returned at action decision block 1107. For example, manager system 110 can provide one or output to send notification data and/or navigation data for receipt by social media system 150 at block 1503 and/or by client computer devices 120A-120Z at block 1202. Notification data and/or navigation data received by social media system 150 at block 1503 refers to data to be communicated to an N user via messaging system of social media system 150 and so, at block 1503, social media system 150 can forward notification data and/or navigation data for receipt by client computer device of client computer devices 120A-120Z. As set forth herein in reference to Tables B-D, notification data can include notification data to direct a user to travel to an enterprise venue being operated by an enterprise. Navigation data can include navigation data that navigates a user to a location of a venue and/or which includes navigation data to navigate a user to a specific location within a venue. As set forth herein in reference to Tables B-D notification data and/or navigation data can be differentiated between classifications of users. One or more action specified within an action decision of the decision data structures of Tables B-D can include an action decision to activate a machine learning process.

Manager system 110 at block 1108 can provide one or more output. Such one or more output can include an output to activate machine learning training at block 1109. At block 1109, one or more predictive models such as predictive models 5002, 6002, and 7002 (FIGS. 5-7) can be iteratively trained block 1109. Also at block 1109, a process can be activated to track an outcome of a notification to direct a user to a venue. Manager system 110 can store in events area 2122 of data repository 112, data specifying whether a notification to direct a user to an enterprise venue was successful or unsuccessful. Manager system 110 can then use such success or nonsuccess data to train a predictive model for predicting whether the user will visit or not visit an enterprise venue that is specified in a notification.

Manager system 110 can iteratively train predictive model 8002 as depicted in FIG. 8. Predictive model 8002 can be trained using reinforcement machine learning training processes. Predictive model 8002 can be iteratively trained using training data that comprises for each of a plurality of historical instances of notification and/or navigation data associated to an action decision. A data set comprising notification and/or navigation data combined with a visit/not visit status associated to the notification and/or navigation data. Predictive model 8002 can thus be trained with training data that specifies data associated to a prior instance of an action decision with respect to a certain user and that user's visit/not visit status associated to the action decision, which action decision is an action decision with associated notification data and/or navigation data to direct a user to visit an enterprise venue. Predictive model 8002 once trained is able to predict based on applied query data whether or not a user will visit an enterprise venue. There can be applied as query data to predictive model 8002 a dataset comprising notification data and/or navigation data and in response to the applied query data, predictive model 8002 can return a result provided by a prediction as to whether the user in response to the notification data and/or navigation data designed to induce the user to visit an enterprise venue will be successful in inducing the user to travel to and visit the enterprise venue.

Manager system 110 can be configured to use predictive model 8002 once trained at action decision block 1107. For example, manager system 110 prior to usage of a decision data structure, such as described in connection with Tables B-D can query predictive model 8002 to ascertain whether predictive model 8002 can return prediction data that specifies a level of confidence associated with the prediction. For example, a returned prediction of 0.7 can indicate 70% likelihood that a user presented with notification data and/or navigation data specified in query data will actually visit an enterprise venue. Manager system 110 can be configured so that manager system 110 uses a current action decision specified in a decision data structure conditionally based on a likelihood of visiting an enterprise venue exceeding a threshold, but in the case that predictive model 8002 returns a prediction indicating a likelihood of a user visiting an enterprise venue is below a threshold, manager system 110 can be configured to replace a current action decision with a replacement action decision, e.g. a replacement action decision specified in a predetermined list provided by an administrator user. Over time, action decisions that are specified in decision data structures with use of machine learning processes with converge on action decisions that are more likely to induce a user to visit an enterprise venue. On completion of block 1109, manager system 110 can proceed to block 1110.

At block 1110, manager system 110 can determine whether a current identified event identified by examination of social media data has ended. Manager system 110 at block 1110 for determining whether an event has ended can determine whether a user has actually visited an enterprise venue based on an examination of location data received from client computer devices 120A-120Z, e.g. as may be output by GPS devices incorporated into such client computer devices, or based on location data that specifies a location of client computer devices 120A-120Z as received from an alternative locating service.

Manager system 110 at block 1110 can determine that an event has ended based on a scheduled end time of an identified event, or can determine an event end based on an actual event end, e.g. by examining location data of attendees of an event as may be provided by GPS output data output by GPS output devices incorporated into client computer devices 120A-120Z. Manager system 110 can determine that an event has ended based on less than a threshold percentage of attendees remaining at an event venue. An event end can also be determined to be a buffer time after a scheduled event end time, e.g. an hour after, two hours after, and the like. In the case that an event has not ended, manager system 110 can return to block 1101 to continue to receive data of social media system 150 and can process such data iteratively at blocks 1101-1110 until an event has been determined to be ended at block 1110. When manager system 110 determines that an event has ended, manager system 110 can proceed to block 1111 to perform logging the final statistics regarding event and can send the data and update responsively to data repository 112 for receipt and storage by data repository 112 at block 1124, e.g. updates can be stored in events area 2122 of data repository 112. At block 1112, manager system 110 can return to block 1101 to receive for examination additional data of social media system 150.

Embodiments herein recognize than an enterprise is often unaware that an increase in patronage is likely going to occur at or near an enterprise venue. If the enterprise were alerted, it would provide a commerce incentive to try to pull in that nearby concentration of individuals to the enterprise venue. Embodiments herein can provide alerts to an enterprise of a likely group nearby so they can plan accordingly.

Embodiments herein can include a social network that allow users to define events having associated event venues. Locations and descriptions of events can be identified, as well as topics associated to an event. Based on returned data events can be classified by event classification, e.g. birthday party, wedding, work gathering or the like. Enterprise venues nearby the event venue can be identified. The nearby enterprise venues identified and their associated enterprises can see incoming nearby events that are going to happen nearby. Optionally, enterprises can set an "alert" to only notify when upcoming events only meet certain one or more criterion. Criterion can be based on e.g. (a) the number of people attending; (b) the demographics of people attending; (c) the location of origin of the people attending; and/or (d) the age of the people attending. Upon viewing/being alerted of upcoming events nearby, an enterprise can responsively activate a promotion to reflect the event. If the topic of the event is able to be determined, this would also be provided to the business. For example, a birthday party is happening at Alison's Restaurant next to Bob's Bakery, Bob's bakery can automatically (I) activate the discount for "50% off birthday all birthday cakes" once notified of upcoming nearby activity from the social network (II) order popular items to supply likely increase of demand due to increased patronage; (III) increase location signage; and/or (IV) place workers outside to draw in the increased crowd. The social network can also allow enterprises to "target" ads/promotions through existing mediums directly to the people that: (1) Were invited to the event; (2) Accepted the event; (3) Declined the event; (4) Not sure if attending event; (5) Socially interacted with the event e.g. (i) commented; (ii) liked; (ii). shared. The promotion/targeted ad can remain active for time ranges specified by the enterprise, such as: specified time period associated with the event; for example, 1 day after the event, corresponding to the event, e.g. exact dates/times of the event padded time associated with the event such as 2 hours before and after the event. If the event is cancelled or rescheduled the nearby establishment venues can be alerted.

Certain embodiments herein may offer various technical computing advantages involving computing advantages to address problems arising in the realm of computer systems and computer networks, and in particular computer systems and networks operating to provide location based services (LBS). Embodiments herein address problems of big data, such as reducing the capture of erroneous data. Embodiments herein recognize that where erroneous data records are accumulated, resources can be consumed to prune bad data stored in databases and the proliferation of erroneous data can slow processing resources. By deployment of cognitive artificial intelligence (AI) for identification of targeted contacts, the incidence of erroneous data collection can be reduced, and processing efficiencies improved. Embodiments herein can include examining data from various sources such as from a social media system and from enterprise systems which can provide data, e.g. pertaining to specifying inventory items. Embodiments herein can direct a flow of users within an environment, e.g. to direct users from a location of an event venue to a location of an enterprise venue. Directing flow of users can enhance resource utilization and can avoid unnecessary travel on the part of users. Embodiments herein can include geofence processing to automatically filter out data for examination to reduce computation resources overhead associated with examining to return one or more action decision. Embodiments herein can include use of action decisions to direct flow of users externally of an event venue location to result in reduced congestion at an event venue. Embodiments can deploy geofence processing for filtering data to reduce candidate dataset sized and reduction of processing workloads, Decision data structures can be employed for efficient and accurate return of data decisions, and such decision data structures can be iteratively adapted with use of machine learning processes. Various decision data structures can be used to drive artificial intelligence (AI) decision making such as decision data structures that cognitively map user classifications that are independence on interactions of a user with post content specifying an event to action decisions. Machine learning processes can be performed for increased accuracy and for reduction of reliance on rules based criterion and thus reduce computational overhead. For enhancement of computational accuracies embodiments can feature computational platforms existing only in the realm of computer systems and networks such as AI platforms and machine learning platforms. Embodiments herein can employ data structuring processes, e.g. processes for transforming unstructured data into a form optimized for computerized processing. Embodiments herein can associate data to data structures provided by relationship graphs for enhancement of processing efficiencies by alleviating a need for excessive re-querying of resources to iteratively re-learn relationships. Embodiments herein can examine data from diverse data sources, such as social media data sources, enterprise system data sources, and client computer devices which can output and send location data specifying a location of a client computer device. Embodiments herein can include AI processing platforms featuring improved processes to transform unstructured data into structured form permitting computer based analytics and decision making. Certain embodiments may be implemented by use of a cloud platform/data center in various types including a software as a service (SAAS), platform as a service (PAAS), database as a service (DBAAS), and combinations thereof based on types of subscription the static optimization service may be provided for subscribed business entities and/or individuals in need for any location in the world.

Figure 11:
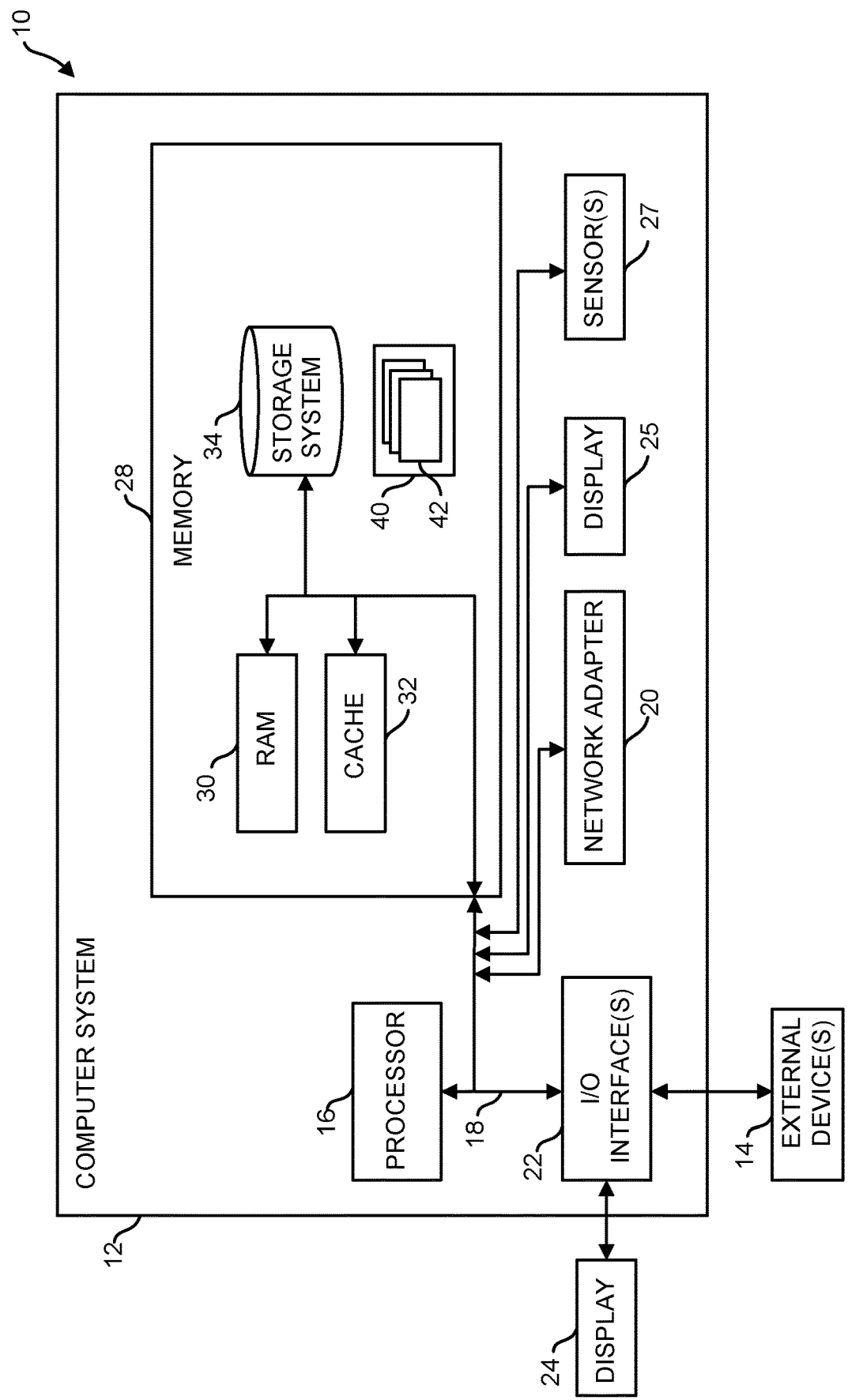
FIG. 11 depicts a computing node according to one embodiment.
Figure 12:
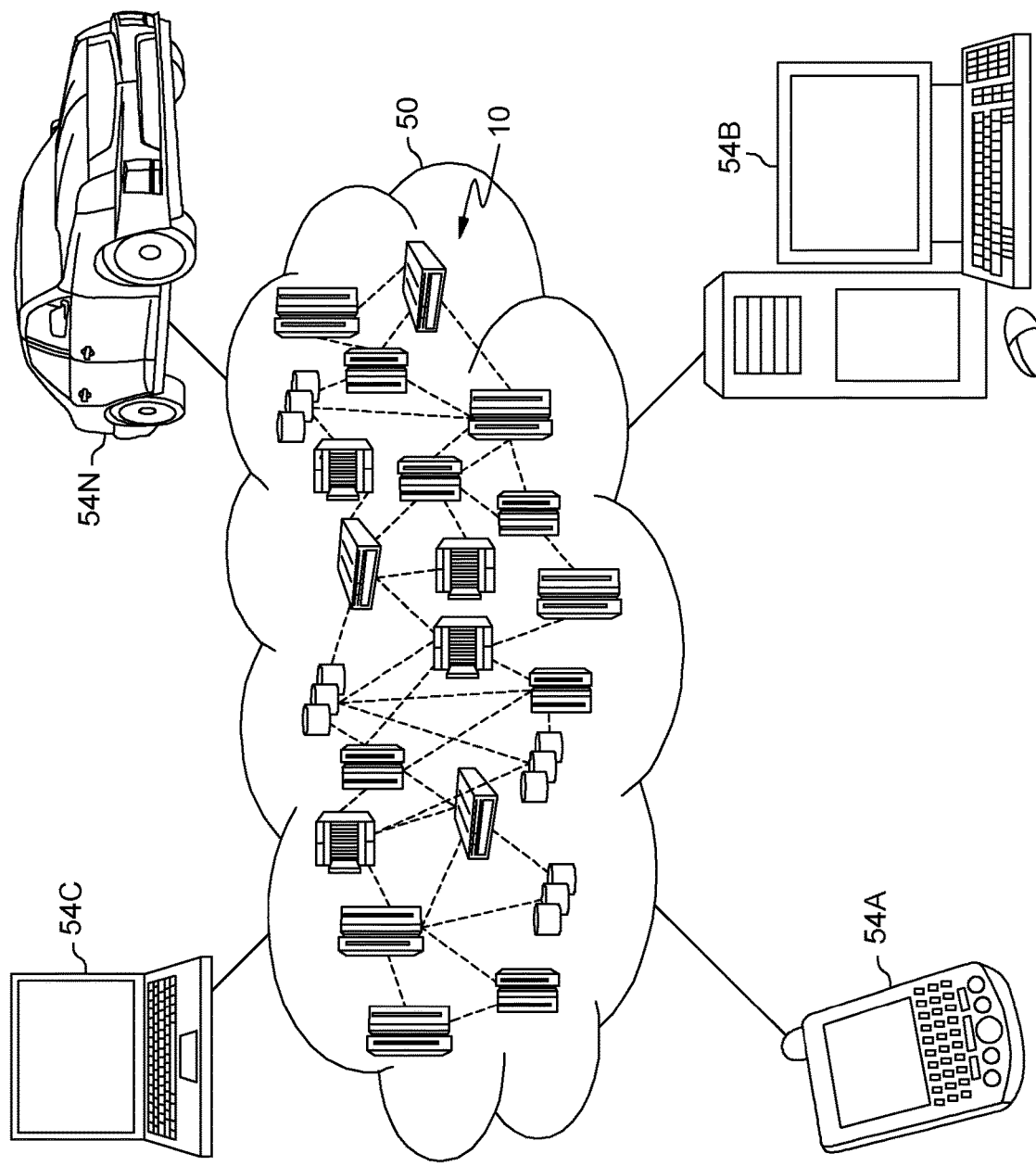
FIG. 12 depicts a cloud computing environment according to one embodiment.
Figure 13:
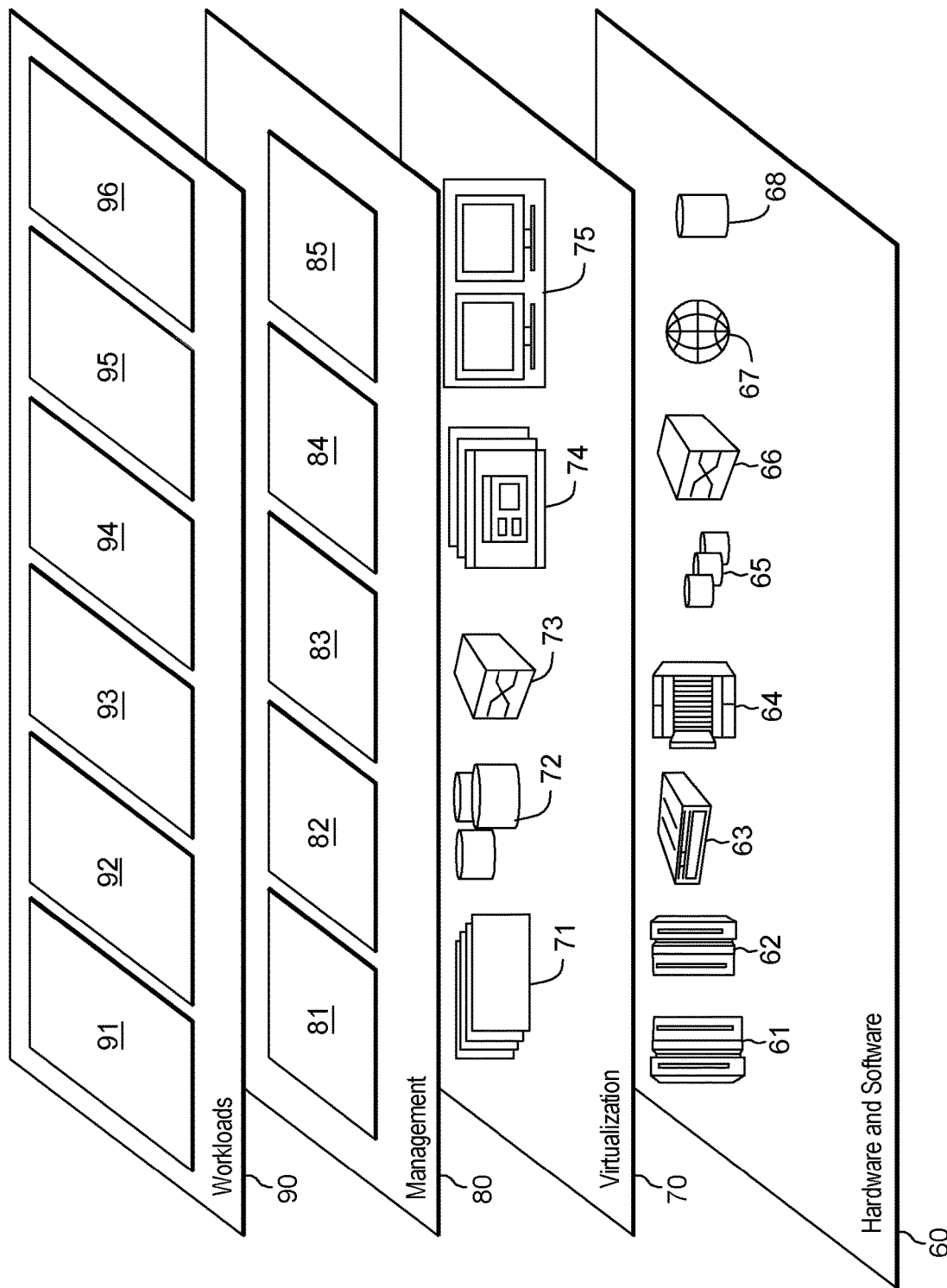
FIG. 13 depicts abstraction model layers according to one embodiment.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12-13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to manager system 110 as set forth in the flowchart of FIGS. 3A-3B. In one embodiment, one or more client computer device 120A-120Z can include one or more computing node 10 and can include one or more program 40 for performing functions described with reference to one or more client computer device 120A-120Z as set forth in the flowchart of FIGS. 3A-3B. In one embodiment, social media system 150 can include one or more computing node 10 and can include one or more program 40 for performing functions described with reference to social media system 150 as set forth in the flowchart of FIGS. 3A-3B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 12 computing node 10 is described as being implemented in a cloud computing environment and accordingly is referred to as a cloud computing node in the context of FIG. 12.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for determining a relevance of a venue event and responsively providing output as set forth herein. The processing components 96 can be implemented with use of one or more program 40 described in FIG. 11.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:

examining social media system data, wherein the social media system data includes text based post content of a plurality of users of a social media system having the social media system data, and wherein the examining includes running a Natural Language Processing (NLP) process to return from the examining social media system data topic classifiers;

identifying a planned venue event in dependence on the examining, wherein the planned venue event is planned for occurrence at an event venue;

determining a relevance of the planned venue event to an enterprise, the enterprise having an associated enterprise venue; and providing one or more output in dependence on the determining, wherein the providing one or more output includes sending navigation data to a client computer device of a first user, wherein the navigation data includes self-driving vehicle navigation data that causes a self-driving vehicle of the first user associated to the client computer device to automatically transport the first user to the enterprise venue, wherein the providing one or more output includes sending first notification data to a client computer device of a first user who has interacted with post data specifying the planned venue event, and sending second notification data to a client computer device of a second user who has interacted with post data specifying the planned venue event, so that the second notification data is differentiated from the first notification data in dependence on a differentiation between the second user's interaction with the post data specifying the planned venue event, and the first user's interaction with the post data specifying the event, wherein the determining the relevance of the planned venue event to an enterprise includes determining the relevance based on a topic match factor, wherein the topic match factor is based on topic similarity between topics of post content specifying the planned event, and topics of inventory associated to the enterprise venue, wherein the first notification data and the second notification data include text based data prompting the first user and the second user, respectively, to travel to the enterprise venue.

2. The method of claim 1, wherein the providing one or more output includes sending communications to multiple respective users of the plurality of users to prompt the multiple respective users to travel to the enterprise venue.

3. The method of claim 1, wherein the providing one or more output includes sending communications to multiple respective users of the plurality of users to prompt the multiple respective users to travel to the enterprise venue, and wherein the method is performed so that a second communication of the communications sent to a second user of the multiple respective users is differentiated from a first communication of the communications sent to the first user of the multiple respective users.

4. The method of claim 1, wherein the relevance of the planned venue event to an enterprise is based on one or more criterion defined by the enterprise, and wherein the providing one or more output includes sending communications to multiple respective users of the plurality of users to prompt the multiple respective users to travel to the enterprise venue.

5. The method of claim 1, wherein the providing one or more output includes sending communications to multiple respective users of the plurality of users to prompt the multiple respective users to travel to the enterprise venue, and wherein the method is performed so that a second communication of the communications sent to a second user of the multiple respective users is differentiated from a first communication of the communications sent to the first user of the multiple respective users, wherein the second communication is differentiated from the first communication in dependence on differentiated post data of the second user and the first user in the social media system, and wherein the examining includes running the Natural Language Processing (NLP) process to return from examined data of the text based post content segmented words and the topic classifiers.

6. The method of claim 1, wherein the determining the relevance of the planned venue event to an enterprise includes determining the relevance based on plurality of factors, wherein factors of the plurality of factors are defined by the enterprise, the plurality of factors including a topic match factor, an event size factor, and a distance factor, wherein a topic match factor is based on topic similarity between topics of post content specifying the planned event and topics of inventory associated to the enterprise venue, wherein the distance factor is based on a distance between the enterprise venue and the event venue, and wherein the event size factor is based on a predicted number of attendees of the planned event, wherein the predicted number of attendees is predicted using historical data of users who have interacted with post data, the post data including text that specifies the planned venue event.

7. The method of claim 1, wherein the determining the relevance of the planned venue event to an enterprise includes determining the relevance based on plurality of factors, wherein factors of the plurality of factors are defined by the enterprise, the plurality of factors including a topic match factor, an event size factor, and a distance factor, wherein a topic match factor is based on topic similarity between topics of post content specifying the planned event and topics of inventory associated to the enterprise venue, wherein the distance factor is based on a distance between the enterprise venue and the event venue, and wherein the event size factor is based on a predicted number of attendees of the planned event, wherein the predicted number of attendees is predicted using historical data of users who have interacted with post data, the post data including text that specifies the planned venue event.

8. The method of claim 1, wherein providing one or more output includes sending navigation data to a client computer device of a first user, wherein the navigation data includes navigation data to navigate the first user to the enterprise venue, wherein the first user is a user who has interacted with post data specifying the planned venue event, wherein the providing one or more output included providing the one or more output in dependence on an interaction of the first user with the post data specifying the planned venue event.

9. The method of claim 1, wherein providing one or more output includes sending first navigation data to a client computer device of a first user who has interacted with post data specifying the planned venue event, and sending second navigation data to a client computer device of a second user who has interacted with post data specifying the planned venue event, so that the second navigation data is differentiated from the first navigation in dependence on a differentiation between the second user's interaction with the post data specifying the planned venue event, and the first user's interaction with the post data specifying the event, wherein the first navigation data includes navigation data to navigate the first user to the enterprise venue, wherein the first navigation data includes navigation data to navigate the first user to the enterprise venue.

10. The method of claim 1, wherein providing one or more output includes sending first notification data to a client computer device of a first user who has interacted with post data specifying the planned venue event, and sending second notification data to a client computer device of a second user who has interacted with post data specifying the planned venue event, so that the second notifications data is differentiated from the first notification data in dependence on a differentiation between the second user's interaction with the post data specifying the planned venue event, and the first user's interaction with the post data specifying the event, wherein the providing one or more output in dependence on the determining includes providing the one or more output in response to a relevance score indicating the relevance exceeding a threshold, wherein the determining the relevance of the planned venue event to an enterprise includes determining the relevance based on a topic match factor, wherein the topic match factor is based on topic similarity between topics of post content specifying the planned event, and topics of inventory associated to the enterprise venue.

11. The method of claim 1, wherein the determining the relevance of the planned venue event to an enterprise includes determining the relevance based on a topic match factor, wherein the topic match factor is based on topic similarity between preference topics of users who have interacted with post data specifying the planned event, and topics of inventory associated to the enterprise venue, wherein the determining the relevance of the planned venue event to an enterprise includes determining the relevance based on a distance between the event venue and the enterprise venue.

12. The method of claim 1, wherein the determining the relevance of the planned venue event to the enterprise is in dependence on one or more criterion defined by an administrator user of the enterprise using an administrator user interface, wherein the determining the relevance of the planned venue event to an enterprise includes predicting an attendance of the planned venue event, wherein the predicting is in dependence on an examination of post data specifying the planned venue event.

13. The method of claim 1, wherein the method includes determining an event classification of the venue event, and establishing a geofence about the event venue, the geofence having a size that is in dependence on the event classification, wherein the providing one or more output includes sending data to one or more client computer responsively to a determination that the enterprise venue is within the geofence.

14. The method of claim 1, wherein the method includes determining an event classification of the venue event, assigning demographic data to users of the plurality of users in dependence on the event classification, and determining the relevance of the planned venue event to an enterprise in dependence on the assigned demographic data.

15. The method of claim 1, wherein the method includes simultaneously with the determining the relevance of the planned venue event to the enterprise, determining a relevance of the planned venue event to a second enterprise, the second enterprise having a second enterprise venue, wherein the relevance of the event to the enterprise is in dependence on one or more criterion defined by a first administrator of the enterprise, and wherein the relevance of the event to the second enterprise is in dependence on second one or more criterion defined by a second administrator of the second enterprise, the second one or more criterion being different than the one or more criterion.

16. The method of claim 1, wherein the determining the relevance of the planned venue event to an enterprise includes determining the relevance based on plurality of factors, the plurality of factors including a topic match factor, an event size factor, and a distance factor, wherein a topic match factor is based on topic similarity between topics of post content specifying the planned event determined using Natural Language Processing and topics of inventory associated to the enterprise venue, wherein the topic match factor is also based on topic similarity between preference topics of users who have interacted with post data specifying the planned event, wherein the distance factor is based on a distance between the enterprise venue and the event venue, and wherein the event size factor is based on a predicted number of attendees of the planned event, wherein the predicted number of attendees is predicted using historical data of users who have interacted with post data, the post data including text that specifies the planned venue event, wherein predicting the predicted number of attendees of the planned event includes querying a predictive model, the predictive model being trained with iteratively applied training data that includes for each of a set of iterations (a) group post interaction data associated with an historical planned event and (b) number of observed attendees of the historical planned event.

17. The method of claim 1, wherein the determining the relevance of the planned venue event to an enterprise includes determining the relevance based on plurality of factors, the plurality of factors including a topic match factor, an event size factor, and a distance factor, wherein a topic match factor is based on topic similarity between topics of post content specifying the planned event determined using Natural Language Processing and topics of inventory associated to the enterprise venue, wherein the topic match factor is also based on topic similarity between preference topics of users who have interacted with post data specifying the planned event, wherein the distance factor is based on a distance between the enterprise venue and the event venue, and wherein the event size factor is based on a predicted number of attendees of the planned event, wherein the predicted number of attendees is predicted using historical data of users who have interacted with post data, the post data including text that specifies the planned venue event, wherein predicting the predicted number of attendees of the planned event includes querying a predictive model, the predictive model being trained with iteratively applied training data that includes for each of a set of iterations (a) group post interaction data associated with an historical planned event and (b) the number of observed attendees of the historical planned event, wherein providing one or more output includes sending first notification data to a client computer device of a first user who has interacted with post data specifying the planned venue event, and sending second notification data to a client computer device of a second user who has interacted with post data specifying the planned venue event, so that the second notification data is differentiated from the first notification data in dependence on a differentiation between the second user's interaction with the post data specifying the planned venue event, and the first user's interaction with the post data specifying the event, wherein the method includes determining an event classification of the venue event, and establishing a geofence about the event venue, the geofence having a size that is in dependence on the event classification, wherein the providing one or more output includes sending data to one or more client computer responsively to a determination that the enterprise venue is within the geofence, wherein the method includes simultaneously with the determining the relevance of the planned venue event to the enterprise, determining a relevance of the planned venue event to a second enterprise, the second enterprise having a second enterprise venue, wherein the relevance of the event to the enterprise is in dependence on one or more criterion defined by a first administrator of the enterprise, and wherein the relevance of the event to the second enterprise is in dependence on second one or more criterion defined by a second administrator of the second enterprise, the second one or more criterion being different than the one or more criterion.

18. A computer program product comprising:
a computer readable storage medium readable by one or more processing circuit and storing instructions for execution by one or more processor for performing a method comprising:
examining social media system data, wherein the social media system data includes text based post content of a plurality of users of a social media system having the social media system data, and wherein the examining includes running a Natural Language Processing (NLP) process to return from the examining social media system data topic classifiers;
identifying a planned venue event in dependence on the examining, wherein the planned venue event is planned for occurrence at an event venue;
determining a relevance of the planned venue event to an enterprise, the enterprise having an associated enterprise venue; and
providing one or more output in dependence on the determining, wherein the providing one or more output includes sending navigation data to a client computer device of a first user, wherein the navigation data includes self-driving vehicle navigation data that causes a self-driving vehicle of the first user associated to the client computer device to automatically transport the first user to the enterprise venue, wherein the providing one or more output includes sending first notification data to a client computer device of a first user who has interacted with post data specifying the planned venue event, and sending second notification data to a client computer device of a second user who has interacted with post data specifying the planned venue event, so that the second notification data is differentiated from the first notification data in dependence on a differentiation between the second user's interaction with the post data specifying the planned venue event, and the first user's interaction with the post data specifying the event, wherein the determining the relevance of the planned venue event to an enterprise includes determining the relevance based on a topic match factor, wherein the topic match factor is based on topic similarity between topics of post content specifying the planned event, and topics of inventory associated to the enterprise venue, wherein the first notification data and the second notification data include text based data prompting the first user and the second user, respectively, to travel to the enterprise venue.

19. A system comprising:
a memory;
at least one processor in communication with the memory; and
program instructions executable by one or more processor via the memory to perform a method comprising:

examining social media system data, wherein the social media system data includes text based post content of a plurality of users of a social media system having the social media system data, and wherein the examining includes running a Natural Language Processing (NLP) process to return from the examining social media system data topic classifiers;

identifying a planned venue event in dependence on the examining, wherein the planned venue event is planned for occurrence at an event venue;

determining a relevance of the planned venue event to an enterprise, the enterprise having an associated enterprise venue; and providing one or more output in dependence on the determining, wherein the providing one or more output includes sending navigation data to a client computer device of a first user, wherein the navigation data includes self-driving vehicle navigation data that causes a self-driving vehicle of the first user associated to the client computer device to automatically transport the first user to the enterprise venue, wherein the providing one or more output includes sending first notification data to a client computer device of a first user who has interacted with post data specifying the planned venue event, and sending second notification data to a client computer device of a second user who has interacted with post data specifying the planned venue event, so that the second notification data is differentiated from the first notification data in dependence on a differentiation between the second user's interaction with the post data specifying the planned venue event, and the first user's interaction with the post data specifying the event, wherein the determining the relevance of the planned venue event to an enterprise includes determining the relevance based on a topic match factor, wherein the topic match factor is based on topic similarity between topics of post content specifying the planned event, and topics of inventory associated to the enterprise venue, wherein the first notification data and the second notification data include text based data prompting the first user and the second user, respectively, to travel to the enterprise venue.

20. The method of claim 1, wherein the post content includes one or more of the following selected from the group consisting of text content and photograph content.

* * * * *